(12) United States Patent
Chitta et al.

(10) Patent No.: US 9,247,608 B2
(45) Date of Patent: Jan. 26, 2016

(54) LOAD CONTROL DEVICE FOR A LIGHT-EMITTING DIODE LIGHT SOURCE

(71) Applicant: Lutron Electronics Co., Inc., Coopersburg, PA (US)

(72) Inventors: Venkatesh Chitta, Center Valley, PA (US); Jeffrey S. Hayes, Allentown, PA (US); Robert D. Stevens, Jr., Emmaus, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 14/536,491

(22) Filed: Nov. 7, 2014

(65) Prior Publication Data
US 2015/0130372 A1 May 14, 2015

Related U.S. Application Data

(60) Provisional application No. 61/901,480, filed on Nov. 8, 2013, provisional application No. 62/032,229, filed on Aug. 1, 2014.

(51) Int. Cl.
*H05B 37/02* (2006.01)
*H05B 33/08* (2006.01)
*H02M 1/08* (2006.01)
(Continued)

(52) U.S. Cl.
CPC ............ *H05B 33/0851* (2013.01); *H02M 1/08* (2013.01); *H02M 3/33569* (2013.01); *H05B 33/0815* (2013.01); *H05B 33/0839* (2013.01); *H02M 2001/0009* (2013.01); *H02M 2001/0035* (2013.01); *H02M 2001/0058* (2013.01)

(58) Field of Classification Search
USPC .......................... 315/224, 276, 291, 308, 360
See application file for complete search history.

(56) References Cited

U.S. PATENT DOCUMENTS 5,568,044 A  10/1996  Bittner
6,707,264 B2  3/2004  Lin et al.
(Continued)

FOREIGN PATENT DOCUMENTS

CN  102612227 A  7/2012
EP  2 383 873 B1  4/2010
(Continued)

OTHER PUBLICATIONS

Wikipedia, "Forward Converter", Available online at <http://en.wikipedia.org/wiki/Forward_converter>, retrieved on Mar. 16, 2015, 2 pages.

*Primary Examiner* — Thuy Vinh Tran
(74) *Attorney, Agent, or Firm* — Condo Roccia Koptiw LLP

(57) ABSTRACT

A load control device for controlling the amount of power delivered to an electrical load is able to operate in a burst mode to adjust the amount of power delivered to the electrical load to low levels. The load control device comprises a control circuit that operates in a normal mode to regulate an average magnitude of a load current conducted through the load to a target load current that ranges from a maximum rated current to a minimum rated current. The control circuit operates in the burst mode to regulate the average magnitude of the load current below the minimum rated current. During the burst mode, the control circuit regulates a peak magnitude of the load current to the minimum rated current during a first time period, and stops regulating the load current during a second time period, such that the average magnitude of the load current is below the minimum rated current.

40 Claims, 19 Drawing Sheets

(51) Int. Cl.
*H02M 3/335* (2006.01)
*H02M 1/00* (2007.01)

(56) References Cited

U.S. PATENT DOCUMENTS

| | | | |
|---|---|---|---|
| 6,788,006 B2 | 9/2004 | Yamamoto | |
| 6,841,947 B2 | 1/2005 | Berg-johansen | |
| 7,061,191 B2 | 6/2006 | Chitta | |
| 7,102,339 B1 | 9/2006 | Ferguson | |
| 7,102,340 B1 | 9/2006 | Ferguson | |
| 7,211,966 B2 | 5/2007 | Green et al. | |
| 7,265,524 B2 * | 9/2007 | Jordan | H02M 3/158 323/225 |
| 7,420,333 B1 | 9/2008 | Hamdad et al. | |
| 7,492,619 B2 * | 2/2009 | Ye | H02M 3/33507 323/225 |
| 7,535,183 B2 | 5/2009 | Gurr | |
| 7,642,734 B2 | 1/2010 | De Anna | |
| 7,759,881 B1 | 7/2010 | Melanson | |
| 7,791,584 B2 | 9/2010 | Korcharz et al. | |
| 7,855,520 B2 | 12/2010 | Leng | |
| 7,863,827 B2 | 1/2011 | Johnsen et al. | |
| 7,923,939 B1 | 4/2011 | Hamdad et al. | |
| 8,044,608 B2 | 10/2011 | Kuo et al. | |
| 8,076,867 B2 | 12/2011 | Kuo et al. | |
| 8,154,223 B2 | 4/2012 | Hsu et al. | |
| 8,198,832 B2 | 6/2012 | Bai et al. | |
| 8,217,591 B2 | 7/2012 | Chobot et al. | |
| 8,258,710 B2 | 9/2012 | Alexandrovich et al. | |
| 8,258,714 B2 | 9/2012 | Liu | |
| 8,283,875 B2 | 10/2012 | Grotkowski et al. | |
| 8,288,967 B2 | 10/2012 | Liu | |
| 8,288,969 B2 | 10/2012 | Hsu et al. | |
| 8,299,987 B2 | 10/2012 | Neudorf et al. | |
| 8,310,845 B2 | 11/2012 | Gaknoki et al. | |
| 8,319,448 B2 | 11/2012 | Cecconello et al. | |
| 8,339,053 B2 | 12/2012 | Yamasaki et al. | |
| 8,339,063 B2 | 12/2012 | Yan et al. | |
| 8,339,066 B2 | 12/2012 | Thornton et al. | |
| 8,339,067 B2 | 12/2012 | Lin et al. | |
| 8,354,804 B2 | 1/2013 | Otake et al. | |
| 8,368,322 B2 | 2/2013 | Yu et al. | |
| 8,378,589 B2 | 2/2013 | Kuo et al. | |
| 8,400,079 B2 | 3/2013 | Kanamori et al. | |
| 8,427,081 B2 | 4/2013 | Hsu et al. | |
| RE44,228 E | 5/2013 | Park et al. | |
| 8,466,628 B2 | 6/2013 | Shearer et al. | |
| 8,482,219 B2 | 7/2013 | Kuo et al. | |
| 8,487,540 B2 | 7/2013 | Dijkstra et al. | |
| 8,487,546 B2 | 7/2013 | Melanson | |
| 8,492,982 B2 | 7/2013 | Hagino et al. | |
| 8,492,987 B2 | 7/2013 | Nuhfer et al. | |
| 8,492,988 B2 | 7/2013 | Nuhfer et al. | |
| 8,508,150 B2 | 8/2013 | Kuo et al. | |
| 8,541,952 B2 | 9/2013 | Darshan | |
| 8,558,474 B1 | 10/2013 | Zhang et al. | |
| 8,558,518 B2 | 10/2013 | Irissou et al. | |
| 8,581,511 B2 | 11/2013 | Kim et al. | |
| 8,587,968 B2 | 11/2013 | Zhu et al. | |
| 8,593,069 B2 | 11/2013 | Kang et al. | |
| 8,598,804 B2 | 12/2013 | Foxall et al. | |
| 8,624,526 B2 | 1/2014 | Huang | |
| 8,664,888 B2 | 3/2014 | Nuhfer et al. | |
| 8,810,159 B2 | 8/2014 | Nuhfer et al. | |
| 2006/0273772 A1 | 12/2006 | Groom | |
| 2008/0043504 A1 | 2/2008 | Ye et al. | |
| 2008/0175029 A1 | 7/2008 | Jung et al. | |
| 2009/0160360 A1 | 6/2009 | Lim et al. | |
| 2010/0156319 A1 * | 6/2010 | Melanson | H05B 33/0839 315/297 |
| 2012/0153920 A1 * | 6/2012 | Guenther | H02M 3/158 323/285 |
| 2013/0063047 A1 | 3/2013 | Veskovic | |
| 2013/0063100 A1 | 3/2013 | Henzler | |
| 2013/0141001 A1 | 6/2013 | Datta et al. | |
| 2013/0229829 A1 * | 9/2013 | Zhang | H02M 3/33507 363/16 |
| 2013/0234612 A1 | 9/2013 | Zeng | |
| 2014/0009084 A1 | 1/2014 | Veskovic | |
| 2014/0009085 A1 | 1/2014 | Veskovic | |
| 2014/0312796 A1 | 10/2014 | Sauerlander et al. | |

FOREIGN PATENT DOCUMENTS

| | | |
|---|---|---|
| EP | 2 579 684 A1 | 4/2012 |
| EP | 2515611 A1 | 10/2012 |
| WO | WO 2008/011041 A2 | 1/2008 |

\* cited by examiner

LOAD CONTROL DEVICE FOR A LIGHT-EMITTING DIODE LIGHT SOURCE

CROSS-REFERENCE TO RELATED APPLICATIONS

This application claims the benefit of U.S. Provisional Application No. 62/032,229 filed on Aug. 1, 2014, and U.S. Provisional Application No. 61/901,480 filed on Nov. 8, 2013, which are incorporated by referenced herein in their entirety.

BACKGROUND

Light-emitting diode (LED) light sources (i.e., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) must be coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

LED light sources are typically rated to be driven via one of two different control techniques: a current load control technique or a voltage load control technique. An LED light source that is rated for the current load control technique is also characterized by a rated current (e.g., approximately 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., approximately 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

It is known that the light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode/technique. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference.

SUMMARY

As described herein, a load control device for controlling the amount of power delivered to an electrical load is able to operate in a burst mode to adjust the amount of power delivered to the electrical load to low levels. The load control device may comprise a load regulation circuit configured to control a magnitude of a load current conducted through the electrical load to control the amount of power delivered to the electrical load. The load control device may comprise a controller coupled to the load regulation circuit and configured to adjust an average magnitude of the load current. The controller may be configured to operate in a normal mode and a burst mode. In the normal mode, the controller may be configured to regulate the average magnitude of the load current to a target load current. The target load current may range from a maximum rated current to a minimum rated current. In the burst mode, the controller may be configured to regulate the average magnitude of the load current below the minimum rated current. For example, during the burst mode, the controller may be configured to regulate a peak magnitude of the load current to the minimum rated current during a first time period using a control loop, and to stop regulating the load current during a second time period, such that the average magnitude of the load current is below the minimum rated current. The control circuit may be configured to freeze the control loop during the second time period.

An LED driver for controlling the intensity of an LED light source may be provided. The LED driver may comprise an LED drive circuit and a controller. The LED drive circuit may be operable to conduct a load current through the LED light source and to control the intensity of the LED light source. The controller may be coupled to the LED drive circuit for adjusting an average magnitude of the load current to control the intensity of the lighting load to a target intensity. The controller may be configured to operate in a normal mode and a burst mode. In the normal mode, the controller may be configured to regulate the average magnitude of the load current to a target load current. The target load current may range from a maximum rated current to a minimum rated current. In the burst mode, the controller may be configured to regulate the average magnitude of the load current below the minimum rated current. During the burst mode, the controller may be configured to control the load regulation circuit in an active state and an inactive state. For example, the controller may be configured to control the load regulation circuit in an active state during a first time period in which the controller regulates a peak magnitude of the load current to the minimum rated current using a control loop. The controller may be configured to control the load regulation circuit in the inactive state during a second time period in which the controller freezes the control loop to stop regulating the load current, such that the average magnitude of the load current is below the minimum rated current.

A load control device for controlling the amount of power delivered to an electrical load may be provided herein. The load control device may comprise a load regulation circuit and a control circuit. The load regulation circuit may be configured to control a magnitude of a load current conducted through the electrical load to control the amount of power delivered to the electrical load. The control circuit may be coupled to the load regulation circuit and configured to adjust an average magnitude of the load current. The control circuit may be configured to operate in a normal mode and a burst mode. The burst mode may comprise an active state during a first time period of a burst mode period and an inactive state during a second time period of the burst mode period. The duration of the active state of the burst mode period is determined based on a burst duty cycle. During the normal mode, the control circuit may be configured to regulate the average magnitude of the load current by holding the burst duty cycle constant and adjusting a target load current. During the burst mode, the control circuit may be configured to regulate the average magnitude of the load current by adjusting the burst duty cycle and/or the target load current. During burst mode, the control circuit may be configured to adjust the target load current by a current offset that ranges from a minimum current offset to a maximum current offset based on the burst duty cycle and a target amount of power to be delivered to the electrical load.

In addition, a load control device for controlling the amount of power delivered to an electrical load may comprise a load regulation circuit configured to control a magnitude of a load current conducted through the electrical load to control the amount of power delivered to the electrical load, and a control circuit coupled to the load regulation circuit and configured to adjust an average magnitude of the load current. The control circuit may be configured to operate in a normal mode to regulate the average magnitude of the load current between a maximum rated current to a minimum rated current. The control circuit may be further configured to operate in a burst mode to regulate the average magnitude of the load current below the minimum rated current. During the burst mode, the control circuit may be configured to regulate a peak magnitude of the load current to a target load current during a first time period, and to stop regulating the load current during a second time period resulting in the average magnitude of the load current being below the minimum rated current. The control circuit may be configured to increase the magnitude of the load current from an initial current to the target load current over a ramp time period at the beginning of the first time period.

DETAILED DESCRIPTION

Figure 1:
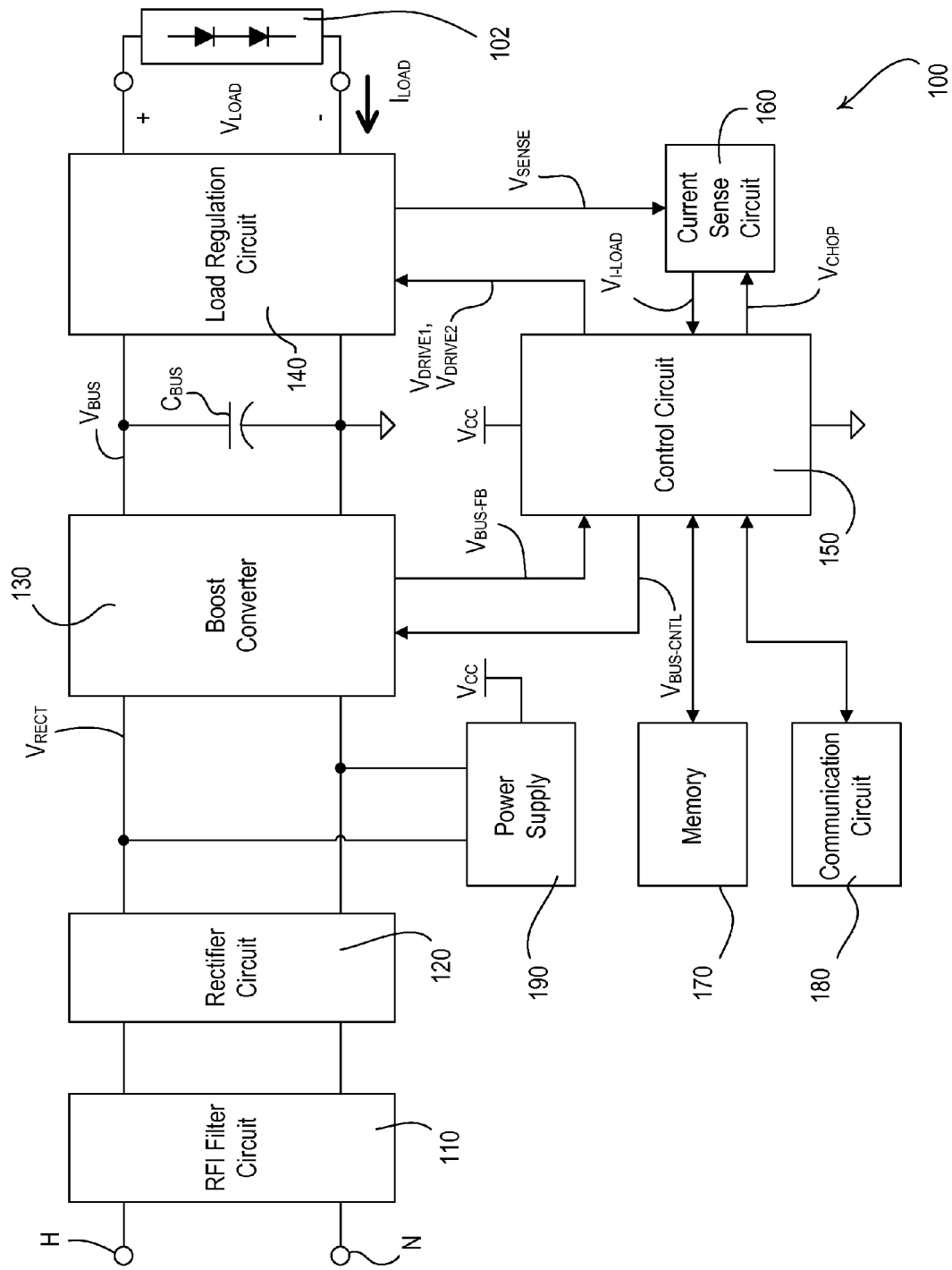
FIG. 1 is a simplified block diagram of a light-emitting diode (LED) driver for controlling the intensity of an LED light source.

FIG. 1 is a simplified block diagram of a load control device, e.g., a light-emitting diode (LED) driver 100, for controlling the amount of power delivered to an electrical load, such as, an LED light source 102 (e.g., an LED light engine), and thus the intensity of the electrical load. The LED light source 102 is shown as a plurality of LEDs connected in series but may comprise a single LED or a plurality of LEDs connected in parallel or a suitable combination thereof, depending on the particular lighting system. The LED light source 102 may comprise one or more organic light-emitting diodes (OLEDs). The LED driver 100 may comprise a hot terminal H and a neutral terminal that are adapted to be coupled to an alternating-current (AC) power source (not shown).

The LED driver 100 may comprise a radio-frequency (RFI) filter circuit 110, a rectifier circuit 120, a boost converter 130, a load regulation circuit 140, a control circuit 150, a current sense circuit 160, a memory 170, a communication circuit 180, and/or a power supply 190. The RFI filter circuit 110 may minimize the noise provided on the AC mains. The rectifier circuit 120 may generate a rectified voltage $V_{RECT}$.

The boost converter 130 may receive the rectified voltage $V_{RECT}$ and generate a boosted direct-current (DC) bus voltage $V_{BUS}$ across a bus capacitor $C_{BUS}$. The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 120 may operate as a power factor correction (PFC) circuit to adjust the power factor of the LED driver 100 towards a power factor of one.

The load regulation circuit 140 may receive the bus voltage $V_{BUS}$ and control the amount of power delivered to the LED light source 102, for example, to control the intensity of the LED light source 102 between a low-end (i.e., minimum) intensity $L_{LE}$ (e.g., approximately 1-5%) and a high-end (i.e., maximum) intensity $L_{HE}$ (e.g., approximately 100%). An example of the load regulation circuit 140 may be an isolated, half-bridge forward converter. An example of the load control device (e.g., LED driver 100) comprising a forward converter is described in greater detail in commonly-assigned U.S. patent application Ser. No. 13/935,799, filed Jul. 5, 2013, entitled LOAD CONTROL DEVICE FOR A LIGHT-EMITTING DIODE LIGHT SOURCE, the entire disclosure of which is hereby incorporated by reference. The load regulation circuit 140 may comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. An example of the control circuit 150 may be a controller. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS\text{-}CNTL}$, which may be provided to the boost converter 130 for adjusting the magnitude of the bus voltage $V_{BUS}$. The control circuit 150 may receive a bus voltage feedback control signal $V_{BUS\text{-}FB}$ from the boost converter 130, which may indicate the magnitude of the bus voltage $V_{BUS}$.

The control circuit 150 may generate drive control signals $V_{DRIVE1}$, $V_{DRIVE2}$. The drive control signals $V_{DRIVE1}$, $V_{DRIVE2}$ may be provided to the load regulation circuit 140 for adjusting the magnitude of a load voltage $V_{LOAD}$ generated across the LED light source 102 and the magnitude of a load current $I_{LOAD}$ conducted through the LED light source 120, for example, to control the intensity of the LED light source 120 to a target intensity $L_{TRGT}$. The control circuit 150 may adjust an operating frequency $f_{OP}$ and/or a duty cycle $DC_{INV}$ (e.g., an on time $T_{ON}$) of the drive control signals $V_{DRIVE1}$, $V_{DRIVE2}$ to adjust the magnitude of the load voltage $V_{LOAD}$ and/or the load current $I_{LOAD}$.

The current sense circuit 160 may receive a sense voltage $V_{SENSE}$ generated by the load regulation circuit 140. The sense voltage $V_{SENSE}$ may indicate the magnitude of the load current $I_{LOAD}$. The current sense circuit 160 may receive a signal-chopper control signal $V_{CHOP}$ from the control circuit 150. The current sense circuit 160 may generate a load current feedback signal $V_{I\text{-}LOAD}$, which may be a DC voltage indicating the average magnitude $I_{AVE}$ of the load current $I_{LOAD}$. The control circuit 150 may receive the load current feedback signal $V_{I\text{-}LOAD}$ from the current sense circuit 160 and control the drive control signals $V_{DRIVE1}$, $V_{DRIVE2}$ accordingly. For example, the control circuit 150 may control the drive control signals $V_{DRIVE1}$, $V_{DRIVE2}$ to adjust a magnitude of the load current $I_{LOAD}$ to a target load current $I_{TRGT}$ to thus control the intensity of the LED light source 102 to the target intensity $L_{TRGT}$ (e.g., using a control loop).

Figure 2:
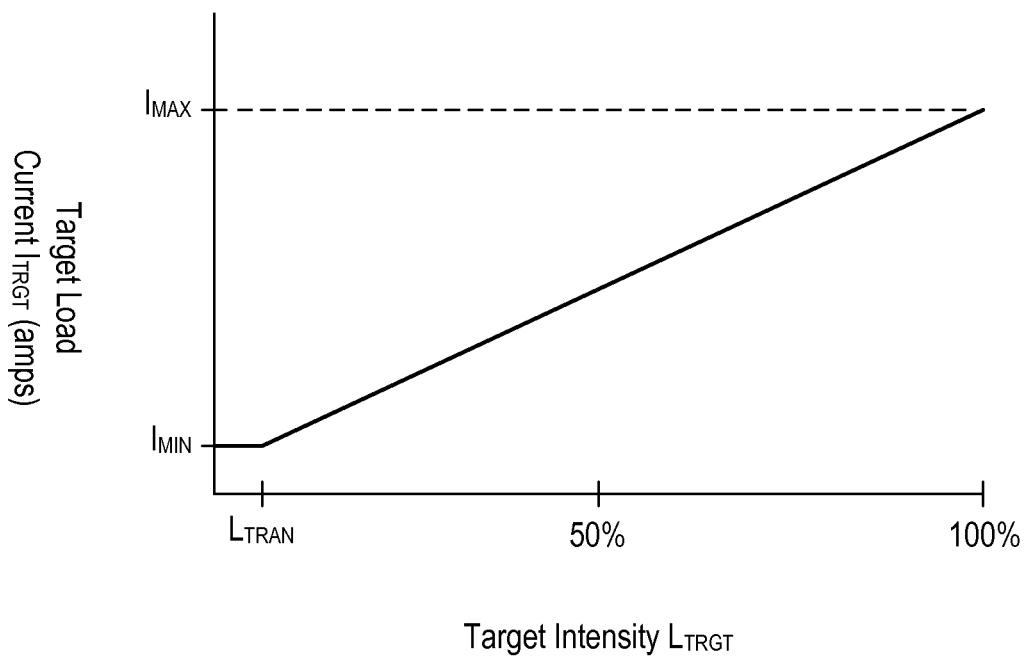
FIG. 2 is an example plot of a target load current of the LED driver of FIG. 1 as a function of a target intensity.
Figure 13:
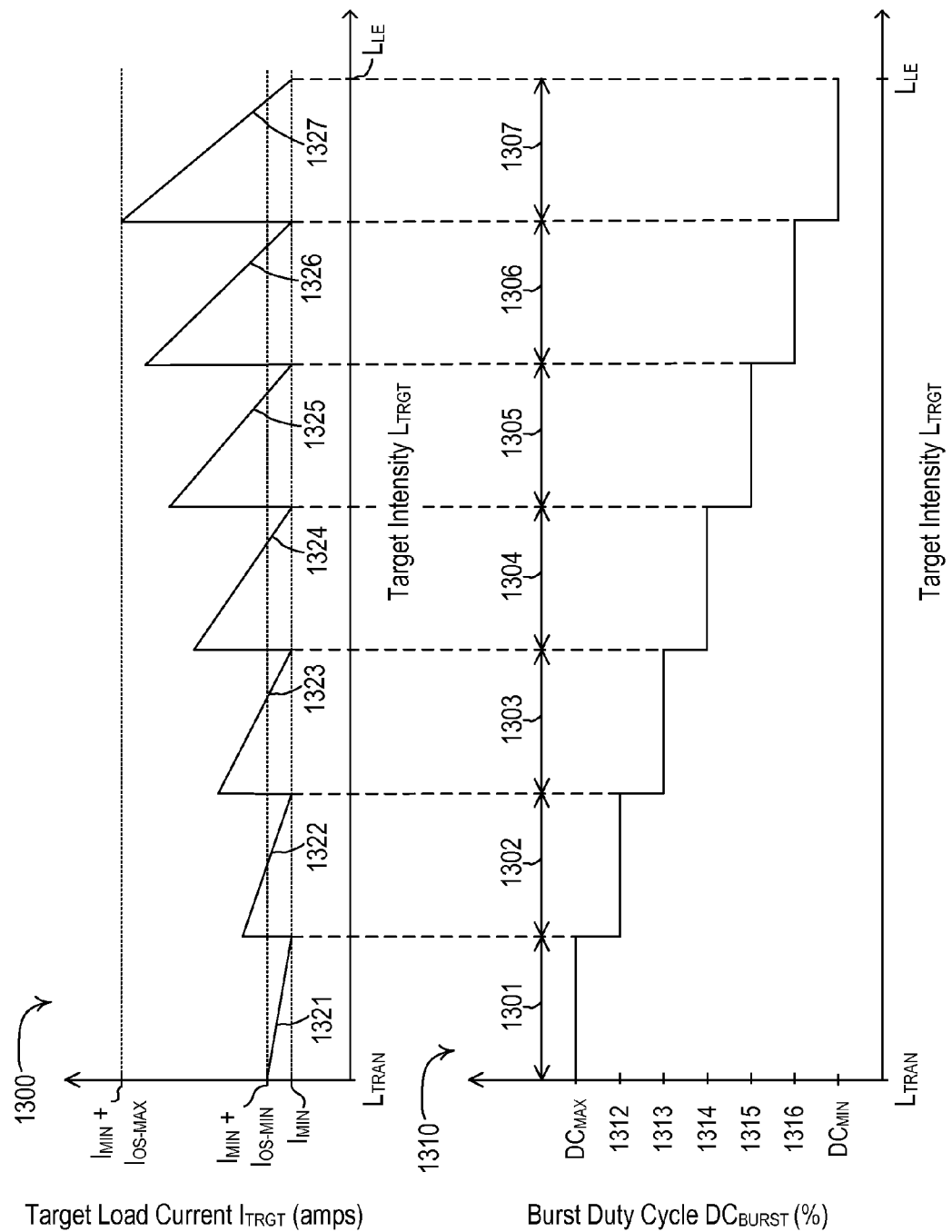
FIG. 13 is an example of a plot relationship between a target load current and the burst duty cycle, and the target intensity of a light source.
Figure 14A:
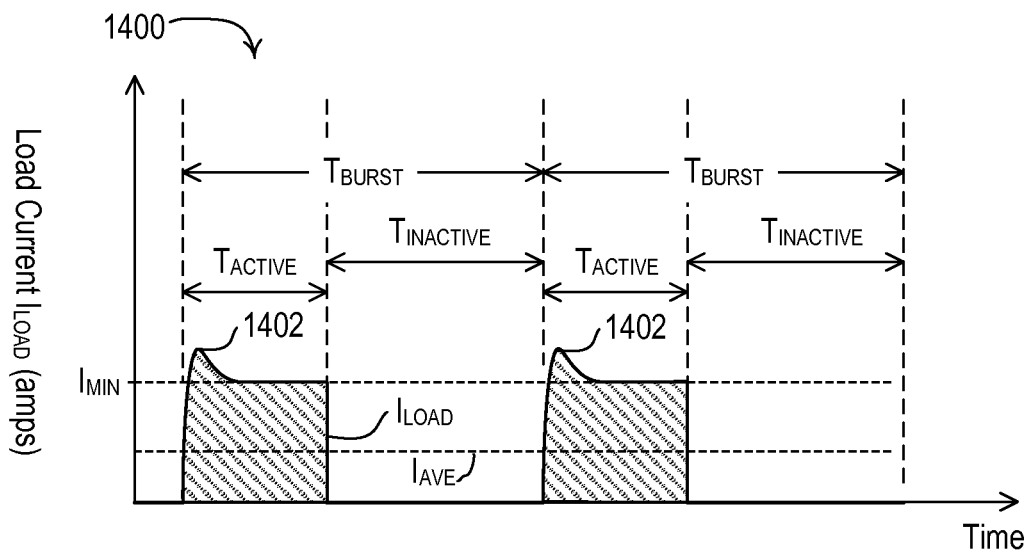
FIG. 14A is an example waveform illustrating an overshoot in a load current conducted through a light source.

The load current $I_{LOAD}$ may be the current that is conducted through the LED light source 120. The target load current $I_{TRGT}$ may be the current that the control circuit 150 would ideally like to conduct through the LED light source 120 (e.g., based at least on the load current feedback signal $V_{I\text{-}LOAD}$). The control circuit 150 may be limited to specific levels of granularity in which it can control the current conducted through the LED light source 120 (e.g., due to inverter cycle lengths, etc.), so the control circuit 150 may not always be able to achieve the target load current $I_{TRGT}$. For example, FIGS. 2 and 13 illustrate the current conducted through an LED light source as a linear graph (at least in parts), and as such, illustrate the target load current $I_{TRGT}$ since the load current $I_{LOAD}$ itself may not actually follow a true linear path. Further, non-ideal reactions of the LED light source 120 (e.g., an overshoot in the load current $I_{LOAD}$, for example, as shown in FIG. 14A) may cause the load current $I_{LOAD}$ to deviate from the target load current $I_{TRGT}$. In the ideal situation, the load current $I_{LOAD}$ is approximately equal to the target load current $I_{TRGT}$.

The control circuit 150 may be coupled to the memory 170. The memory 170 may store operational characteristics of the LED driver 100 (e.g., the target intensity $L_{TRGT}$, the low-end intensity $L_{LE}$, the high-end intensity $L_{HE}$, etc.). The communication circuit 180 may be coupled to, for example, a wired communication link or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to digital messages received via the communication circuit 180. The LED driver 100 may be operable to receive a phase-control signal from a dimmer switch for determining the target intensity $L_{TRGT}$ for the LED light source 102. The power supply 190 may receive the rectified voltage $V_{RECT}$ and generate a direct-current (DC) supply voltage $V_{CC}$ for powering the circuitry of the LED driver 100.

FIG. 2 is an example plot of the target load current $I_{TRGT}$ as a function of the target intensity $L_{TRGT}$. The magnitude of the load current $I_{LOAD}$ may only be regulated to values between a maximum rated current $I_{MAX}$ and a minimum rated current $I_{MIN}$, for example, due to hardware limitations of the load regulation circuit 140 and the control circuit 150. Thus, the target load current $I_{TRGT}$ may only be adjusted between the maximum rated current $I_{MAX}$ and the minimum rated current $I_{MIN}$. When the target intensity $L_{TRGT}$ is between the high-end intensity $L_{HE}$ (e.g., approximately 100%) and a transition intensity $L_{TRAN}$ (e.g., approximately 5%), the control circuit 150 may operate the load regulation circuit 140 in a normal mode in which an average magnitude $I_{AVE}$ of the load current $I_{LOAD}$ is controlled to be equal to the target load current $I_{TRGT}$. In the normal mode, the control circuit 150 may adjust the average magnitude $I_{AVE}$ of the load current $I_{LOAD}$ to the target load current $I_{TRGT}$ in response to the load current feedback signal $V_{I\text{-}LOAD}$, e.g., using closed loop control. The control circuit 150 may adjust the target load current $I_{TRGT}$ between the maximum rated current $I_{MAX}$ and the minimum rated current $I_{MIN}$ in the normal mode, for example, as shown in FIG. 2.

Figure 3:
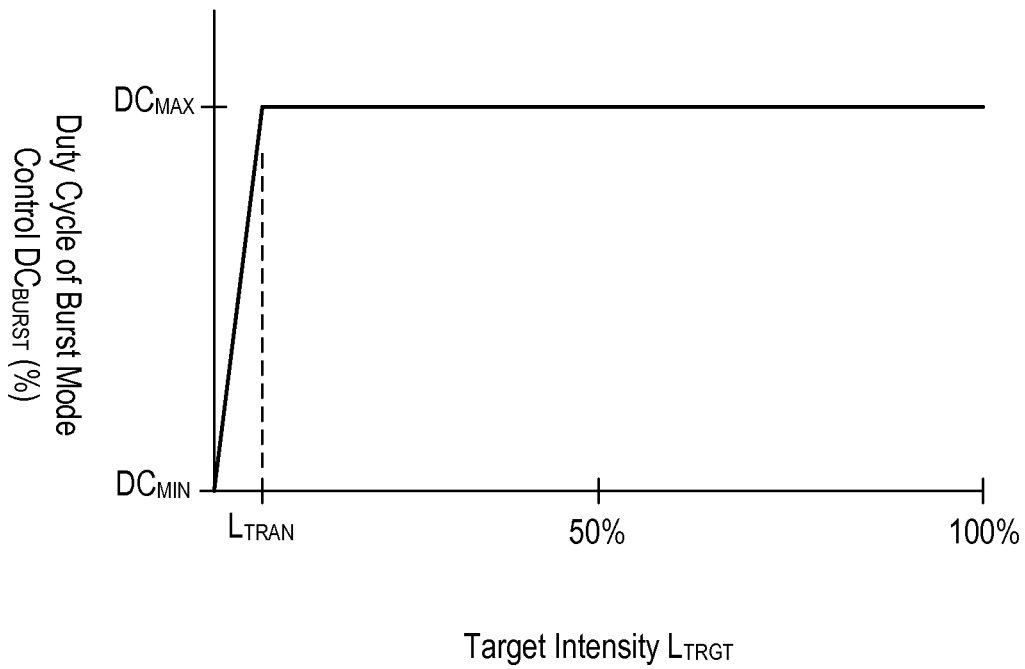
FIG. 3 is an example plot of a burst duty cycle of the LED driver of FIG. 1 as a function of the target intensity.

FIG. 3 is an example plot of a burst duty cycle $DC_{BURST}$ (e.g., an ideal burst duty cycle $DC_{BURST\text{-}IDEAL}$) as a function of the target intensity $L_{TRGT}$. When the target intensity $L_{TRGT}$ is between the high-end intensity $L_{HE}$ (e.g., approximately 100%) and a transition intensity $L_{TRAN}$ (e.g., approximately 5%), the control circuit 150 may be configured to operate the load regulation circuit 140 to set the burst duty cycle $DC_{BURST}$ equal to a maximum duty cycle $DC_{MAX}$ (e.g., approximately 100%). To adjust the target intensity $L_{TRGT}$ below the transition intensity $L_{TRAN}$, the control circuit 150 may be configured to operate the load regulation circuit 140 in a burst mode to reduce the average magnitude $I_{AVE}$ of the load current $I_{LOAD}$ to be less than the minimum rated current $I_{MIN}$. For example, to adjust the target intensity $L_{TRGT}$ below the transition intensity $L_{TRAN}$, the control circuit 150 may be configured to operate the load regulation circuit 140 to reduce the burst duty cycle $DC_{BURST}$ below the maximum duty cycle $DC_{MAX}$. For example, the load regulation circuit 140 may adjust the burst duty cycle $DC_{BURST}$ between the maximum duty cycle $DC_{MAX}$ (e.g., approximately 100%) and a minimum duty cycle $DC_{MIN}$ (e.g., approximately 20%). In the burst mode, a peak magnitude $I_{PK}$ of the load current $I_{LOAD}$ may be equal to the target current $I_{TRGT}$ (e.g., the minimum rated current $I_{MIN}$). For example, the peak magnitude $I_{PK}$ of the load current $I_{LOAD}$ may be equal to the minimum rated current $I_{MIN}$ during an active state of the burst mode.

With reference to FIG. 3, the burst duty cycle $DC_{BURST}$ may refer to an ideal burst duty cycle $DC_{BURST-IDEAL}$, which may include an integer portion $DC_{BURST-INTEGER}$ and/or a fractional portion $DC_{BURST-FRACTIONAL}$. The integer portion $DC_{BURST-INTEGER}$ may be characterized by the percentage of the ideal burst duty cycle $DC_{BURST-IDEAL}$ that includes complete inverter cycles (i.e., an integer value of inverter cycles). The fractional portion $DC_{BURST-FRACTIONAL}$ may be characterized by the percentage of the ideal burst duty cycle $DC_{BURST-IDEAL}$ that includes a fraction of an inverter cycle. As described herein, the control circuit 150 (e.g., via the load regulation circuit 140) may be configured to adjust the number of inverter cycles only by an integer number (i.e., by $DC_{BURST-INTEGER}$) and not a fractional amount (i.e., $DC_{BURST-FRACTIONAL}$). Therefore, the example plot of FIG. 3 may illustrate an ideal curve showing the adjustment of the ideal burst duty cycle $DC_{BURST-IDEAL}$ from a maximum duty cycle $DC_{MAX}$ to a minimum duty cycle $DC_{MIN}$ when the target intensity $L_{TRGT}$ is below the transition intensity $L_{TRAN}$. Nonetheless, unless defined differently, burst duty cycle $DC_{BURST}$ may refer to the integer portion $DC_{BURST-INTEGER}$ of the ideal burst duty cycle $DC_{BURST-IDEAL}$, for example, if the control circuit 150 is not be configured to operate the burst duty cycle $DC_{BURST}$ at fractional amounts.

Figure 4:
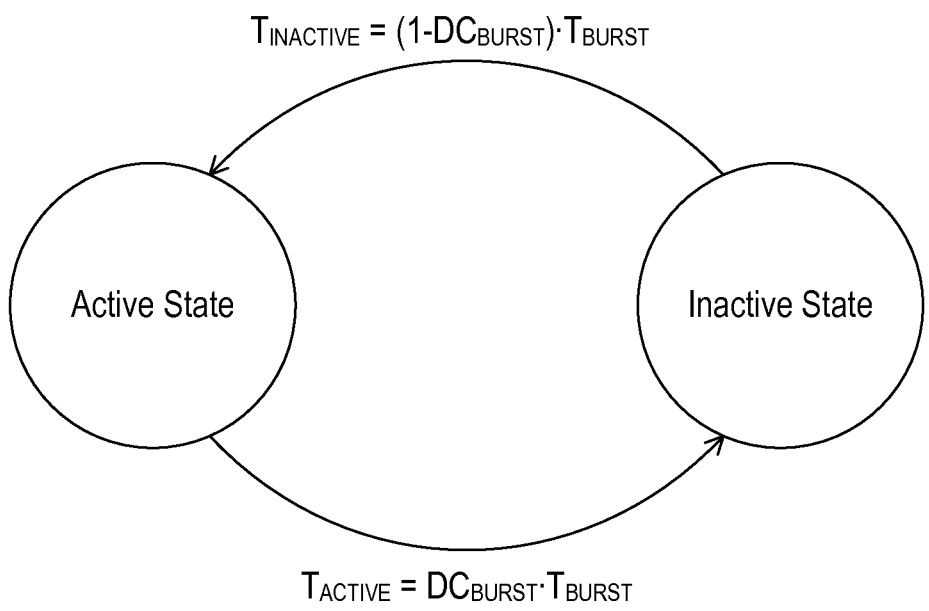
FIG. 4 is an example state diagram illustrating the operation of a load regulation circuit of the LED driver of FIG. 1 when operating in a burst mode.

FIG. 4 is an example state diagram illustrating the operation of the load regulation circuit 140 in the burst mode. During the burst mode, the control circuit 150 may periodically control the load regulation circuit 140 into an active state and an inactive state, e.g., in dependence upon a burst duty cycle $DC_{BURST}$ and a burst mode period $T_{BURST}$ (e.g., approximately 4.4 milliseconds). For example, the active state period ($T_{ACTIVE}$) may be equal to the burst duty cycle ($DC_{BURST}$) times the burst mode period ($T_{BURST}$) and the inactive state period ($T_{INACTIVE}$) may be equal to one minus the burst duty cycle ($DC_{BURST}$) times the burst mode period ($T_{BURST}$). That is, $T_{ACTIVE}=DC_{BURST} \cdot T_{BURST}$ and $T_{INACTIVE}=(1-DC_{BURST}) \cdot T_{BURST}$.

In the active state of the burst mode, the control circuit 150 may generate (e.g., actively generate) the drive control signals $V_{DRIVE1}$, $V_{DRIVE2}$ to adjust the magnitude (e.g., the peak magnitude $I_{PK}$) of the load current $I_{LOAD}$, e.g., using closed loop control. For example, in the active state of the burst mode, the control circuit 150 may generate the drive signals $V_{DRIVE1}$, $V_{DRIVE2}$ to adjust the magnitude of the load current $I_{LOAD}$ to be equal to a target load current $I_{TRGT}$ (e.g., the minimum rated current $I_{MIN}$) in response to the load current feedback signal $V_{I-LOAD}$.

In the inactive state of the burst mode, the control circuit 150 may freeze the control loop and may not generate the drive control signals $V_{DRIVE1}$, $V_{DRIVE2}$, for example, such that the magnitude of the load current $I_{LOAD}$ drops to approximately zero amps. While the control loop is frozen (e.g., in the inactive state), the control circuit 150 may not adjust the values of the operating frequency for and/or the duty cycle $DCTN_V$ in response to the load current feedback signal $V_{I-LOAD}$ (e.g., even though the control circuit 150 is not presently generating the drive signals $V_{DRIVE1}$, $V_{DRIVE2}$). For example, the control circuit 150 may store the present duty cycle $DC_{INV}$ (e.g., the present on time $T_{ON}$) of the drive control signals $V_{DRIVE1}$, $V_{DRIVE2}$ in the memory 170 prior to (e.g., immediately prior to) freezing the control loop. Accordingly, when the control loop is unfrozen (e.g., when the control circuit 150 enters the active state), the control circuit 150 may continue to generate the drive control signals $V_{DRIVE1}$, $V_{DRIVE2}$ using the operating frequency $f_{OP}$ and/or the duty cycle $DC_{INV}$ from the previous active state.

The control circuit 150 may be configured to adjust the burst duty cycle $DC_{BURST}$ using an open loop control. For example, the control circuit 150 may be configured to adjust the burst duty cycle $DC_{BURST}$ as a function of the target intensity $L_{TRGT}$, for example, when the target intensity $L_{TRGT}$ is below the transition intensity $L_{TRAN}$. The control circuit 150 may be configured to linearly decrease the burst duty cycle $DC_{BURST}$ as the target intensity $L_{TRGT}$ is decreased below the transition intensity $L_{TRAN}$ (e.g., as shown in FIG. 3), while the target load current $I_{TRGT}$ is held constant at the minimum rated current $I_{MIN}$ (e.g., as shown in FIG. 2). Since the control circuit 150 changes between the active state and the inactive state in dependence upon the burst duty cycle $DC_{BURST}$ and the burst mode period $T_{BURST}$ (e.g., as shown in the state diagram of FIG. 4), the average magnitude $I_{AVE}$ of the load current $I_{LOAD}$ may be a function of the burst duty cycle $DC_{BURST}$ (e.g., $I_{AVE}=DC_{BURST} \cdot I_{MIN}$). During the burst mode, the peak magnitude $I_{PK}$ of the load current $I_{LOAD}$ may be equal to the minimum rated current $I_{MIN}$, but the average magnitude $I_{AVE}$ of the load current $I_{LOAD}$ may be less than the minimum rated current $I_{MIN}$.

Figure 5:
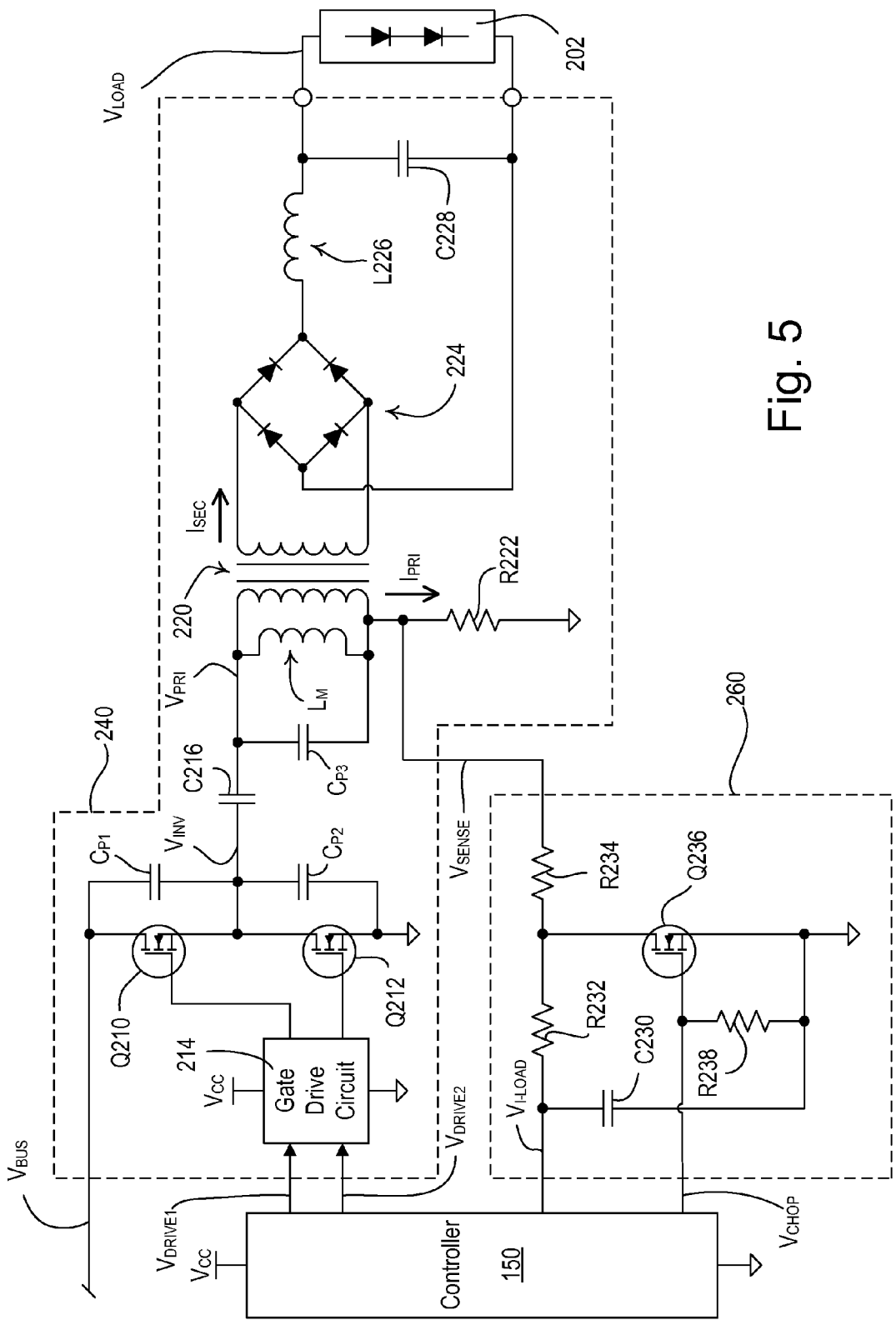
FIG. 5 is a simplified schematic diagram of an isolated forward converter and a current sense circuit of an LED driver.

FIG. 5 is a simplified schematic diagram of a forward converter 240 and a current sense circuit 260 of an LED driver (e.g., the LED driver 100 shown in FIG. 1). The forward converter 240 may be an example of the load regulation circuit 140 of the LED driver 100 shown in FIG. 1. The current sense circuit 260 may be an example of the current sense circuit 160 of the LED driver 100 shown in FIG. 1.

The forward converter 240 may comprise a half-bridge inverter circuit having two field effect transistors (FETs) Q210, Q212 for generating a high-frequency inverter voltage $V_{INV}$ from the bus voltage $V_{BUS}$. The FETs Q210, Q212 may be rendered conductive and non-conductive in response to the drive control signals $V_{DRIVE1}$, $V_{DRIVE2}$. The drive control signals $V_{DRIVE1}$, $V_{DRIVE2}$ may be received from the control circuit 150. The drive control signals $V_{DRIVE1}$, $V_{DRIVE2}$ may be coupled to the gates of the respective FETs Q210, Q212 via a gate drive circuit 214 (e.g., which may comprise part number L6382DTR, manufactured by ST Microelectronics). The control circuit 150 may generate the inverter voltage $V_{INV}$ at a constant operating frequency $f_{OP}$ (e.g., approximately 60-65 kHz) and thus a constant operating period $T_{OP}$. However, the operating frequency for may be adjusted under certain operating conditions. The control circuit 150 may be configured to adjust a duty cycle $DC_{INV}$ of the inverter voltage $V_{INV}$ to control the intensity of an LED light source 202 towards the target intensity $L_{TRGT}$.

In a normal mode of operation, when the target intensity $L_{TRGT}$ of the LED light source 202 is between the high-end intensity $L_{HE}$ and the transition intensity $L_{TRAN}$, the control circuit 150 may adjust the duty cycle $DC_{INV}$ of the inverter voltage $V_{INV}$ to adjust the magnitude (e.g., the average magnitude $I_{AVE}$) of the load current $I_{LOAD}$ towards the target load current $I_{TRGT}$. As previously mentioned, the magnitude of the load current $I_{LOAD}$ may vary between the maximum rated current $I_{MAX}$ and the minimum rated current $I_{MIN}$ (e.g., as shown in FIG. 2). At the minimum rated current $I_{MIN}$ (e.g., at the transition intensity $L_{TRAN}$), the inverter voltage $V_{INV}$ may be characterized by a transition operating frequency $f_{OP-T}$, a transition operating period $T_{OP-T}$, and a transition duty cycle $DC_{INV-T}$.

When the target intensity $L_{TRGT}$ of the LED light source 202 is below the transition intensity $L_{TRAN}$, the control circuit 150 may be configured to operate the forward converter 240 in a burst mode of operation. In one or more embodiments, the control circuit 150 may use power (e.g., a transition power) and/or current (e.g., a transition current) as a threshold to determine when to operate in burst mode (e.g., instead of intensity). In the burst mode of operation, the control circuit 150 may be configured to switch the forward converter 240 between an active mode (e.g., in which the control circuit 150 actively generates the drive control signals $V_{DRIVE1}$, $V_{DRIVE2}$ to regulate the peak magnitude $I_{PK}$ of the load current $I_{LOAD}$ to be equal to the minimum rated current $I_{MIN}$) and an inactive mode (e.g., in which the control circuit 150 freezes the control loop and does not generate the drive control signals $V_{DRIVE1}$, $V_{DRIVE2}$), for example, as shown in the state diagram of FIG. 4. In the burst mode, the control circuit 150 may change the forward converter 240 between the active state and the inactive state in dependence upon a burst duty cycle $DC_{BURST}$ and a burst mode period $T_{BURST}$ (e.g., as shown in FIG. 4) and adjust the burst duty cycle $DC_{BURST}$ as a function of the target intensity $L_{TRGT}$, which is below the transition intensity $L_{TRAN}$ (e.g., as shown in FIG. 3). In the normal mode and in the active state of the burst mode, the forward converter 240 may be characterized by a turn-on time $T_{TURN-ON}$ and a turn-off time $T_{TURN-OFF}$. The turn-on time $T_{TURN-ON}$ may be a time period from when the drive control signals $V_{DRIVE1}$, $V_{DRIVE2}$ are driven until the respective FET Q210, Q212 is rendered conductive. The turn-off time $T_{TURN-OFF}$ may be a time period from when the drive control signals $V_{DRIVE1}$, $V_{DRIVE2}$ are driven until the respective FET Q210, Q212 is rendered non-conductive.

The inverter voltage $V_{INV}$ is coupled to the primary winding of a transformer 220 through a DC-blocking capacitor C216 (e.g., which may have a capacitance of approximately 0.047 μF), such that a primary voltage $V_{PRI}$ is generated across the primary winding. The transformer 220 may be characterized by a turns ratio $n_{TURNS}$ (i.e., $N_1/N_2$), which may be approximately 115:29. A sense voltage $V_{SENSE}$ may be generated across a sense resistor 8222, which may be coupled in series with the primary winding of the transformer 220. The FETs Q210, Q212 and the primary winding of the transformer 220 may be characterized by parasitic capacitances $C_{P1}$, $C_{P2}$, $C_{P3}$, respectively. The secondary winding of the transformer 220 may generate a secondary voltage. The secondary voltage may be coupled to the AC terminals of a full-wave diode rectifier bridge 224 for rectifying the secondary voltage generated across the secondary winding. The positive DC terminal of the rectifier bridge 224 may be coupled to the LED light source 202 through an output energy-storage inductor L226 (e.g., which may have an inductance of approximately 10 mH), such that the load voltage $V_{LOAD}$ may be generated across an output capacitor C228 (e.g., which may have a capacitance of approximately 3 μF).

The current sense circuit 260 may comprise an averaging circuit for producing the load current feedback signal $V_{I-LOAD}$. The averaging circuit may comprise a low-pass filter comprising a capacitor C230 (e.g., which may have a capacitance of approximately 0.066 uF) and a resistor R232 (e.g., which may have a resistance of approximately 3.32 kΩ). The low-pass filter may receive the sense voltage $V_{SENSE}$ via a resistor R234 (e.g., which may have a resistance of approximately 1 kΩ). The current sense circuit 160 may comprise a transistor Q236 (e.g., a FET as shown in FIG. 5) coupled between the junction of the resistors R232, R234 and circuit common. The gate of the transistor Q236 may be coupled to circuit common through a resistor R238 (e.g., which may have a resistance of approximately 22 kΩ). The gate of the transistor Q236 may receive the signal-chopper control signal $V_{CHOP}$ from the control circuit 150. An example of the current sense circuit 260 may be described in greater detail in commonly-assigned U.S. patent application Ser. No. 13/834,153, filed Mar. 15, 2013, entitled FORWARD CONVERTER HAVING A PRIMARY-SIDE CURRENT SENSE CIRCUIT, the entire disclosure of which is hereby incorporated by reference.

Figure 6:
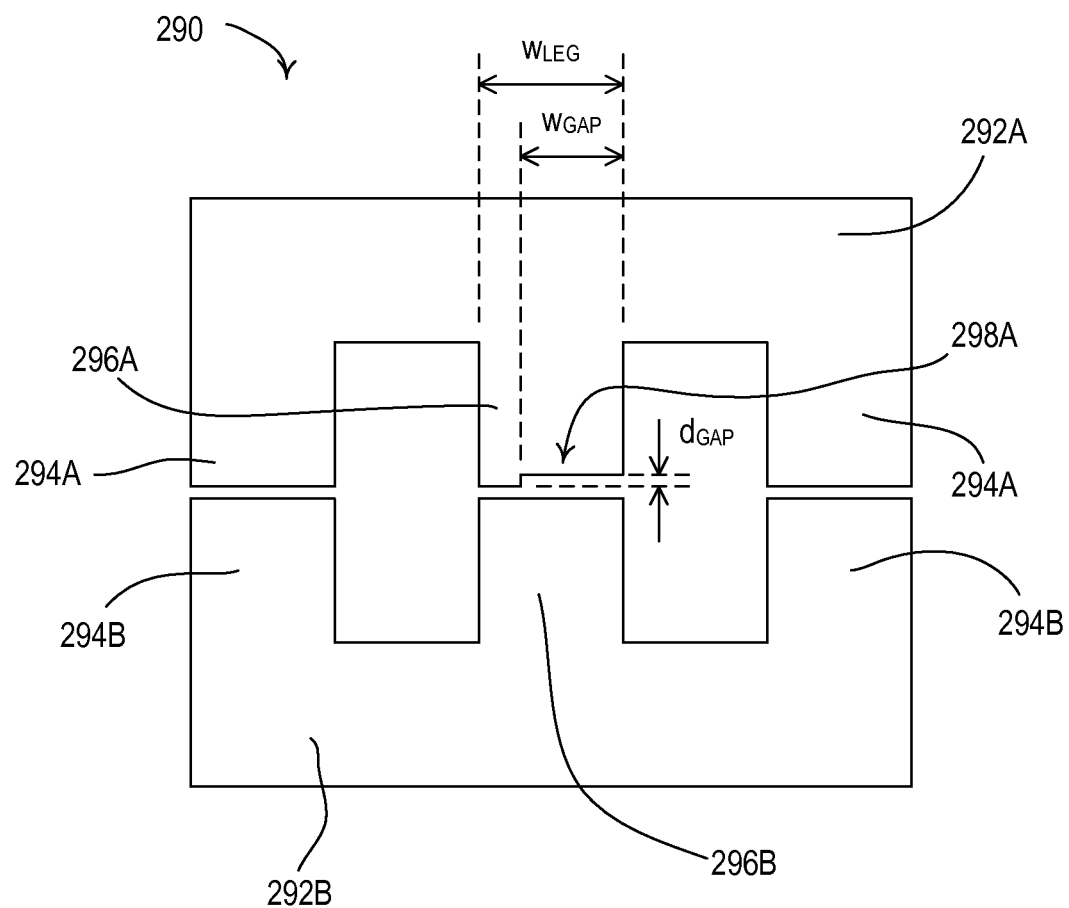
FIG. 6 is an example diagram illustrating a magnetic core set of an energy-storage inductor of a forward converter.

FIG. 6 is an example diagram illustrating a magnetic core set 290 of an energy-storage inductor (e.g., the output energy-storage inductor L226 of the forward converter 240 shown in FIG. 5). The magnetic core set 290 may comprise two E-cores 292A, 292B, and may comprise part number PC40EE16-Z, manufactured by TDK Corporation. The E-cores 292A, 292B may comprise respective outer legs 294A, 294B and inner legs 296A, 296B. Each inner leg 296A, 296B may be characterized by a width $w_{LEG}$ (e.g., approximately 4 mm). The inner leg 296A of the first E-core 292A may comprise a partial gap 298A (i.e., the magnetic core set 290 is partially-gapped), such that the inner legs 296A, 296B are spaced apart by a gap distance $d_{GAP}$ (e.g., approximately 0.5 mm). The partial gap 298A may extend for a gap width $w_{GAP}$ (e.g., approximately 2.8 mm) such that the partial gap 298A extends for approximately 70% of the leg width $w_{LEG}$ of the inner leg 296A. In one or more embodiments, both of the inner legs 296A, 296B may comprise partial gaps. The partially-gapped magnetic core set 290 (e.g., as shown in FIG. 6) may allow the output energy-storage inductor L226 of the forward converter 240 (e.g., shown in FIG. 5) to maintain continuous current at low load conditions (e.g., near the low-end intensity $L_{LE}$).

Figure 7:
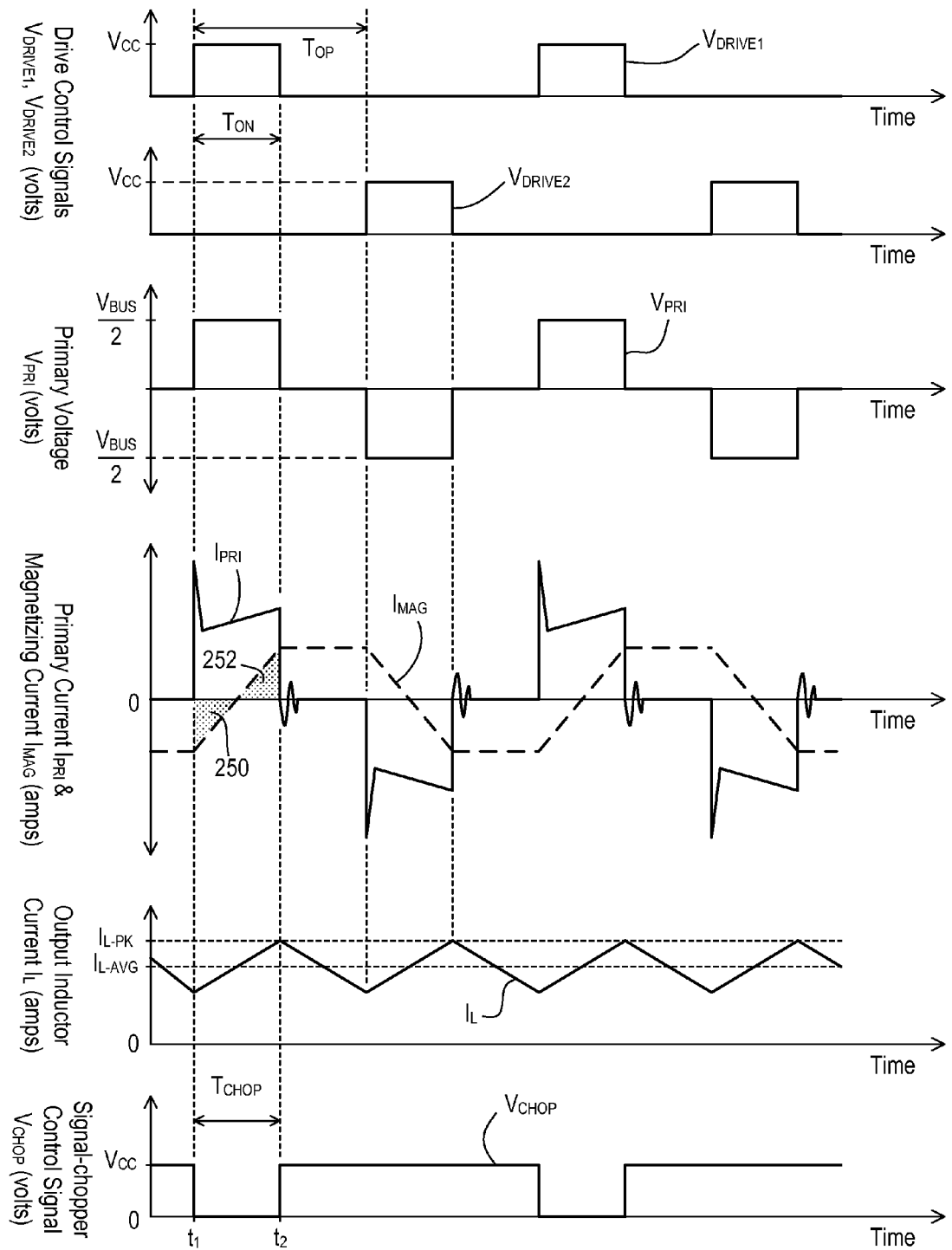
FIG. 7 shows example waveforms illustrating the operation of a forward converter and a current sense circuit when the intensity of an LED light source is near a high-end intensity.

FIG. 7 shows example waveforms illustrating the operation of a forward converter and a current sense circuit, for example, the forward converter 240 and the current sense circuit 260 shown in FIG. 5. For example, the forward converter 240 may generate the waveforms shown in FIG. 7 when operating in the normal mode and in the active state of the burst mode as described herein. As shown in FIG. 7, a control circuit (e.g., the control circuit 150) may drive the respective drive control signals $V_{DRIVE1}$, $V_{DRIVE2}$ high to approximately the supply voltage $V_{CC}$ to render the respective FETs Q210, Q212 conductive for an on time $T_{ON}$ at different times (i.e., the FETs Q210, Q212 are conductive at different times). When the high-side FET Q210 is conductive, the primary winding of the transformer 220 may conduct a primary current $I_{PRI}$ to circuit common through the capacitor C216 and sense resistor R222. After (e.g., immediately after) the high-side FET Q210 is rendered conductive (at time $t_1$ in FIG. 7), the primary current $I_{PRI}$ may conduct a short high-magnitude pulse of current due to the parasitic capacitance $C_{P3}$ of the transformer 220 as shown in FIG. 7. While the high-side FET Q210 is conductive, the capacitor C216 may charge, such that a voltage having a magnitude of approximately half of the magnitude of the bus voltage $V_{BUS}$ is developed across the capacitor. Accordingly, the magnitude of the primary voltage $V_{PRI}$ across the primary winding of the transformer 220 may be equal to approximately half of the magnitude of the bus voltage $V_{BUS}$ (i.e., $V_{BUS}/2$). When the low-side FET Q212 is conductive, the primary winding of the transformer 220 may conduct the primary current $I_{PRI}$ in an opposite direction and the capacitor C216 may be coupled across the primary winding, such that the primary voltage $V_{PRI}$ may have a negative polarity with a magnitude equal to approximately half of the magnitude of the bus voltage $V_{BUS}$.

When either of the high-side and low-side FETs Q210, Q212 are conductive, the magnitude of an output inductor current $I_L$ conducted by the output inductor L226 and the magnitude of the load voltage $V_{LOAD}$ across the LED light source 202 may increase with respect to time. The magnitude of the primary current $I_{PRI}$ may increase with respect to time while the FETs Q210, Q212 are conductive (e.g., after an initial current spike). When the FETs Q210, Q212 are non-conductive, the output inductor current $I_L$ and the load voltage $V_{LOAD}$ may decrease in magnitude with respective to time. The output inductor current $I_L$ may be characterized by a peak magnitude $I_{L-PK}$ and an average magnitude $I_{L-AVG}$, for example, as shown in FIG. 7. The control circuit 150 may increase and/or decrease the on times $T_{ON}$ of the drive control signals $V_{DRIVE1}$, $V_{DRIVE2}$ (e.g., and the duty cycle $DC_{INV}$ of the inverter voltage $V_{INV}$) to respectively increase and decrease the average magnitude $I_{L-AVG}$ of the output inductor current $I_L$, and thus respectively increase and decrease the intensity of the LED light source 202.

When the FETs Q210, Q212 are rendered non-conductive, the magnitude of the primary current $I_{PRI}$ may drop toward zero amps (e.g., as shown at time $t_2$ in FIG. 7 when the high-side FET Q210 is rendered non-conductive). However, a magnetizing current $I_{MAG}$ may continue to flow through the primary winding of the transformer 220 due to the magnetizing inductance $L_{MAG}$ of the transformer. When the target intensity $L_{TRGT}$ of the LED light source 102 is near the low-end intensity $L_{LE}$, the magnitude of the primary current $I_{PRI}$ may oscillate after either of the FETs Q210, Q212 is rendered non-conductive, for example, due to the parasitic capacitances $C_{P1}$, $C_{P2}$ of the FETs, the parasitic capacitance $C_{P3}$ of the primary winding of the transformer 220, and/or any other parasitic capacitances of the circuit, such as, parasitic capacitances of the printed circuit board on which the forward converter 240 is mounted.

The real component of the primary current $I_{PRI}$ may indicate the magnitude of the secondary current $I_{SEC}$ and thus the intensity of the LED light source 202. However, the magnetizing current $I_{MAG}$ (i.e., the reactive component of the primary current $I_{PRI}$) may also flow through the sense resistor R222. The magnetizing current $I_{MAG}$ may change from a negative polarity to a positive polarity when the high-side FET Q210 is conductive, change from a positive polarity to a negative polarity when the low-side FET Q212 is conductive, and remain constant when the magnitude of the primary voltage $V_{PRI}$ is zero volts, for example, as shown in FIG. 7. The magnetizing current $I_{MAG}$ may have a maximum magnitude defined by the following equation:

$$I_{MAG-MAX} = \frac{V_{BUS} \cdot T_{HC}}{4 \cdot L_{MAG}}.$$

where $T_{HC}$ may be the half-cycle period of the inverter voltage $V_{INV}$, i.e., $T_{HC}=T_{OP}/2$. As shown in FIG. 7, the areas 250, 252 are approximately equal, such that the average value of the magnitude of the magnetizing current $I_{MAG}$ is zero during the period of time when the magnitude of the primary voltage $V_{PRI}$ is greater than approximately zero volts (e.g., during the ton time $T_{ON}$ as shown in FIG. 7).

The current sense circuit 260 may determine an average the primary current $I_{PRI}$ during the positive cycles of the inverter voltage $V_{INV}$, i.e., when the high-side FET Q210 is conductive (e.g., during the on time $T_{ON}$). The load current feedback signal $V_{I-LOAD}$, which may be generated by the current sense circuit 260, may have a DC magnitude that is the average value of the primary current $I_{PRI}$ when the high-side FET Q210 is conductive. Because the average value of the magnitude of the magnetizing current $I_{MAG}$ is approximately zero during the period of time that the high-side FET Q210 is conductive (e.g., during the on time $T_{ON}$), the load current feedback signal $V_{I-LOAD}$ generated by the current sense circuit indicates the real component (e.g., only the real component) of the primary current $I_{PRI}$ during the on time $T_{ON}$.

When the high-side FET Q210 is rendered conductive, the control circuit 150 may drive the signal-chopper control signal $V_{CHOP}$ low towards circuit common to render the transistor Q236 of the current sense circuit 260 non-conductive for a signal-chopper time $T_{CHOP}$. The signal-chopper time $T_{CHOP}$ may be approximately equal to the on time $T_{ON}$ of the high-side FET Q210, for example, as shown in FIG. 7. The capacitor C230 may charge from the sense voltage $V_{SENSE}$ through the resistors R232, R234 while the signal-chopper control signal $V_{CHOP}$ is low, such that the magnitude of the load current feedback signal $V_{I-LOAD}$ is the average value of the primary current $I_{PRI}$ and thus indicates the real component of the primary current during the time when the high-side FET Q210 is conductive. When the high-side FET Q210 is not conductive, the control circuit 150 drives the signal-chopper control signal $V_{CHOP}$ high to render the transistor Q236 conductive. Accordingly, the control circuit 150 is able to accurately determine the average magnitude of the load current $I_{LOAD}$ from the magnitude of the load current feedback signal $V_{I-LOAD}$ since the effects of the magnetizing current $I_{MAG}$ and the oscillations of the primary current $I_{PRI}$ on the magnitude of the load current feedback signal $V_{I-LOAD}$ are reduced or eliminated completely.

As the target intensity $L_{TRGT}$ of the LED light source 202 is decreased towards the low-end intensity $L_{LE}$ and the on times $T_{ON}$ of the drive control signals $V_{DRIVE1}$, $V_{DRIVE2}$ get smaller, the parasitic of the load regulation circuit 140 (i.e., the parasitic capacitances $C_{P1}$, $C_{P2}$ of the FETs Q210, Q212, the parasitic capacitance $C_{P3}$ of the primary winding of the transformer 220, and/or other parasitic capacitances of the circuit) may cause the magnitude of the primary voltage $V_{PRI}$ to slowly decrease towards zero volts after the FETs Q210, Q212 are rendered non-conductive.

Figure 8:
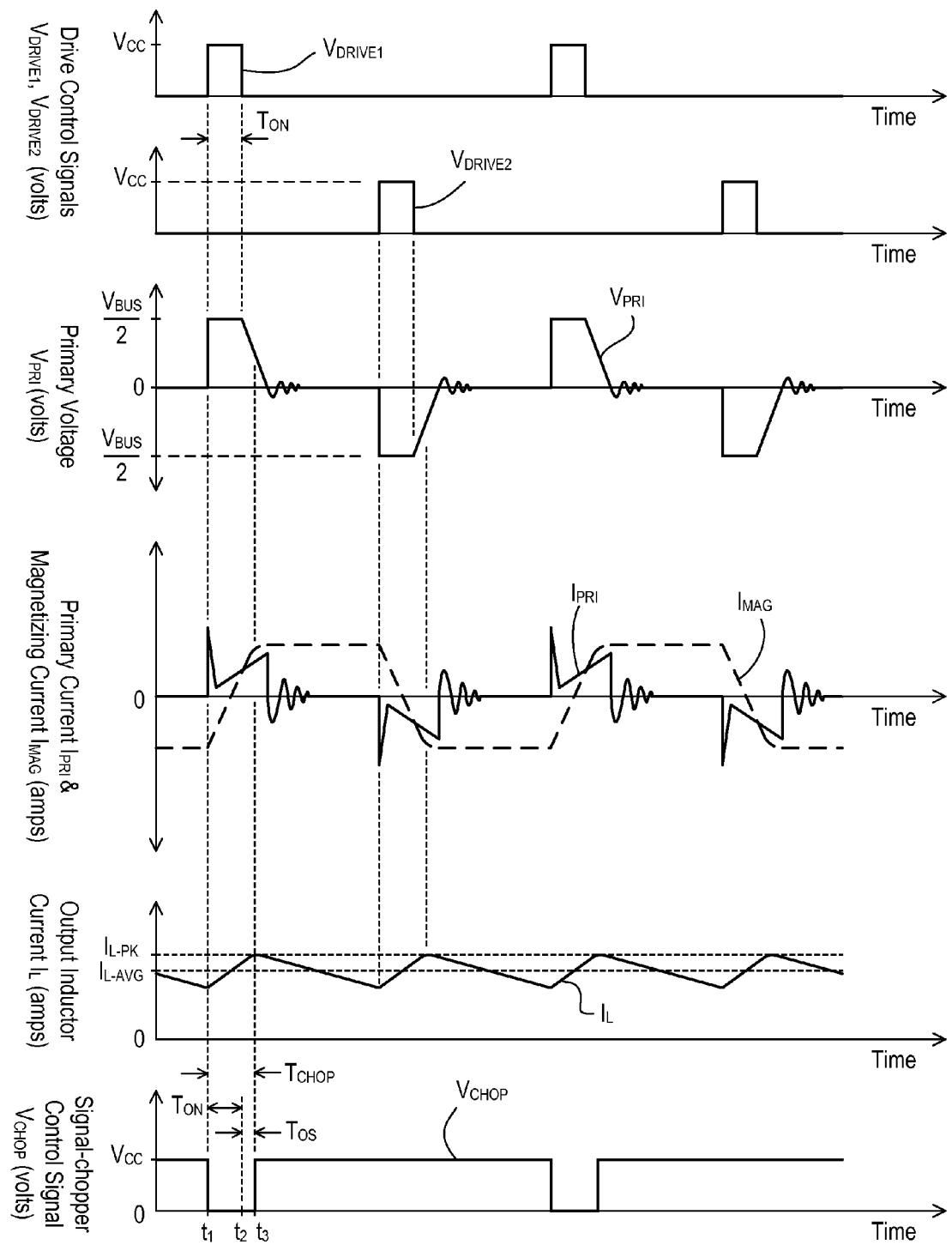
FIG. 8 shows example waveforms illustrating the operation of a forward converter and a current sense circuit when the intensity of an LED light source is near a low-end intensity.

FIG. 8 shows example waveforms illustrating the operation of a forward converter and a current sense circuit (e.g., the forward converter 240 and the current sense circuit 260) when the target intensity $L_{TRGT}$ is near the low-end intensity $L_{LE}$, and when the forward converter 240 is operating in the normal mode and the active state of the burst mode. The gradual drop off in the magnitude of the primary voltage $V_{PRI}$ may allow the primary winding of the transformer 220 to continue to conduct the primary current $I_{PRI}$, such that the transformer 220 may continue to deliver power to the secondary winding after the FETs Q210, Q212 are rendered non-conductive, for example, as shown in FIG. 8. The magnetizing current $I_{MAG}$ may continue to increase in magnitude after the on time $T_{ON}$ of the drive control signal $V_{DRIVE1}$ (e.g., and/or the drive control signal $V_{DRIVE2}$). Accordingly, the control circuit 150 may increase the signal-chopper time $T_{CHOP}$ to be greater than the on time $T_{ON}$. For example, the control circuit 150 may increase the signal-chopper time $T_{CHOP}$ (e.g., during which the signal-chopper control signal $V_{CHOP}$ is low) by an offset time $T_{OS}$ when the target intensity $L_{TRGT}$ of the LED light source 202 is near the low-end intensity $L_{LE}$.

Figure 9:
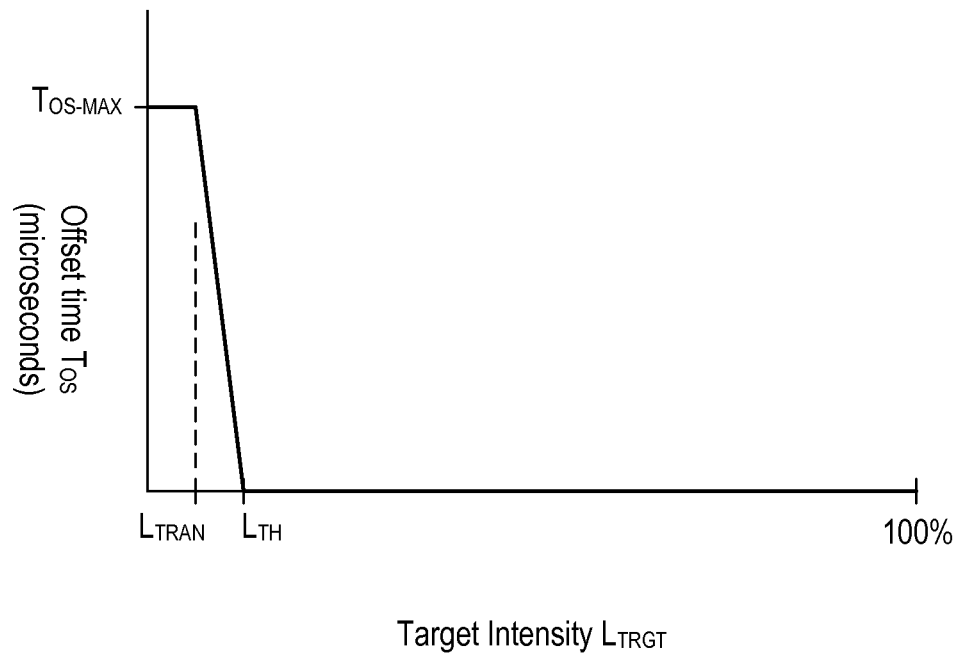
FIG. 9 is an example plot of a relationship between an offset time and a target intensity of an LED driver.

FIG. 9 is an example plot of a relationship between the offset time $T_{OS}$ and the target intensity $L_{TRGT}$ of the LED light source 202, for example, when the target intensity $L_{TRGT}$ is near the low-end intensity $L_{LE}$, and when the forward converter 240 is operating in the normal mode and the active state of the burst mode (e.g., as shown in FIG. 8). The control circuit 150 may adjust the value of the offset time $T_{OS}$ as a function of the target intensity $L_{TRGT}$ of the LED light source 202. For example, the control circuit 150 may adjust the value of the offset time $T_{OS}$ linearly with respect to the target intensity $L_{TRGT}$ when the target intensity $L_{TRGT}$ is below a threshold intensity $L_{TH}$ (e.g., approximately 10%) and above a transition intensity $L_{TRAN}$ (e.g., approximately 5%). Above the threshold intensity $L_{TH}$, the offset time $T_{OS}$ may be held constant, for example, at approximately zero microseconds. Below the transition intensity $L_{TRAN}$, the offset time $T_{OS}$ may be held constant at a maximum offset time $T_{OS-MAX}$, for example, because the target load current $I_{TRGT}$ may be held constant at the minimum rated current $I_{MIN}$ below the transition intensity $L_{TRAN}$.

Figure 10:
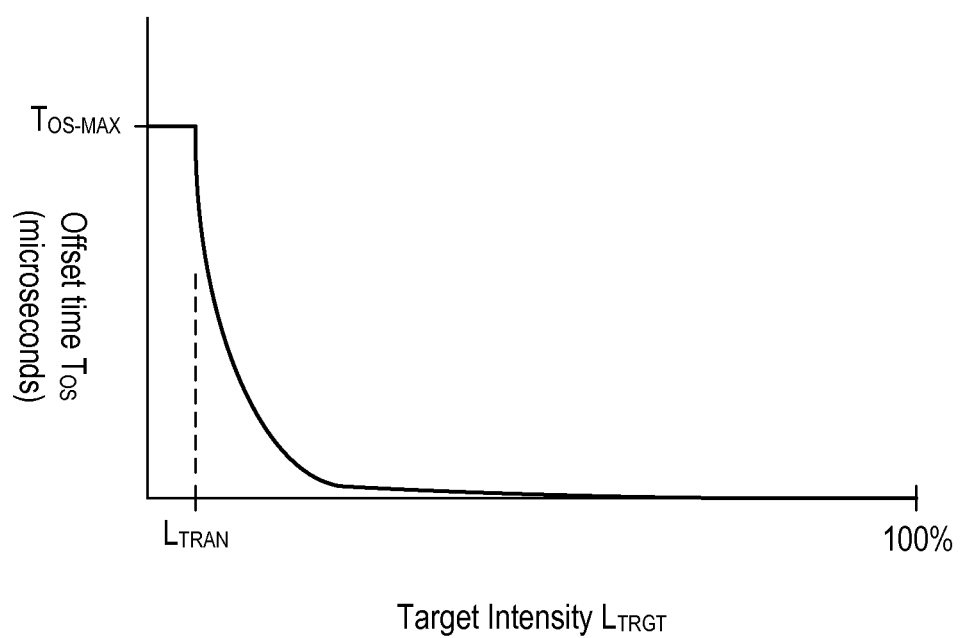
FIG. 10 is an example plot of an alternative relationship between the offset time and the target intensity of an LED driver.

FIG. 10 is an example plot of a relationship (e.g., an alternate relationship) between the offset time $T_{OS}$ and the target intensity $L_{TRGT}$ of the LED light source 202, for example, when the target intensity $L_{TRGT}$ is near the low-end intensity $L_{LE}$, and when the forward converter 240 is operating in the normal mode and the active state of the burst mode (e.g., as shown in FIG. 8). The control circuit 150 may adjust the value of the offset time $T_{OS}$ as a function of the target intensity $L_{TRGT}$ of the LED light source 202. For example, the control circuit 150 may adjust the value of the offset time $T_{OS}$ between the high-end intensity $L_{HE}$ and the transition intensity $L_{TRAN}$, for example, as shown in FIG. 10. For example, the control circuit 150 may use the following equation:

$$T_{OS} = \frac{\frac{V_{BUS}}{4} \cdot C_{PARASITIC}}{\frac{T_{ON} + T_{OS\text{-}PREV}}{T_{HC}} \cdot I_{MAG\text{-}MAX} + \frac{K_{RIPPLE}}{n_{TURNS}} \cdot I_{LOAD}},$$

where $T_{OS\text{-}PREV}$ may be the previous value of the offset time. $K_{RIPPLE}$ may be the dynamic ripple ratio of the output inductor current $I_L$ (e.g., which may be a function of the load current $I_{LOAD}$). For example, $K_{RIPPLE}$ may be determined according to the following equation:

$$K_{RIPPLE} = I_{L\text{-}PK}/I_{L\text{-}AVG},$$

and $C_{PARASITIC}$ may be the total parasitic capacitance between the junction of the FETs Q210, Q212 and circuit common. Below the transition intensity $L_{TRAN}$, the offset time $T_{OS}$ may be held constant at a maximum offset time $T_{OS-MAX}$.

Figure 11:
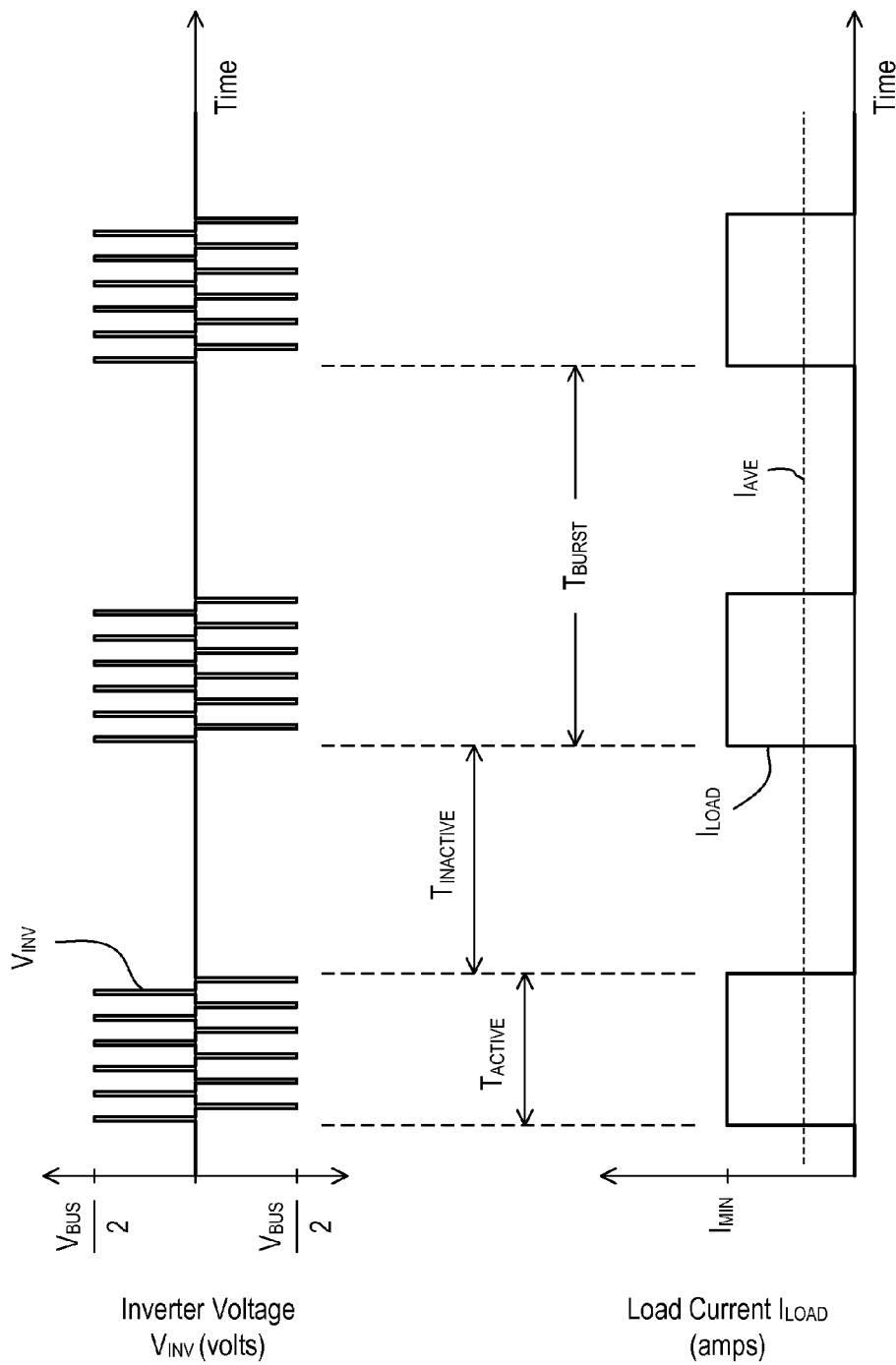
FIG. 11 shows example waveforms illustrating the operation of a forward converter of an LED driver when operating in a burst mode.

FIG. 11 shows example waveforms illustrating the operation of a forward converter when operating in a burst mode (e.g., the forward converter 240 shown in FIG. 5). The inverter circuit of the forward converter 240 may generate the inverter voltage $V_{INV}$ during the active state (e.g., for length of an active state period $T_{ACTIVE}$ as shown in FIG. 11), for example, such that the magnitude of the load current $I_{LOAD}$ may be regulated to the minimum rated current $I_{MIN}$. The inverter voltage $V_{INV}$ may not be generated during the inactive state, e.g., for an inactive state period $T_{INACTIVE}$. The active state may begin on a periodic basis at a burst mode period $T_{BURST}$ (e.g., approximately 4.4 milliseconds). The active state period $T_{ACTIVE}$ and inactive state period $T_{INACTIVE}$ may be characterized by durations that are dependent upon a burst duty cycle $DC_{BURST}$. For example, $T_{ACTIVE} = DC_{BURST} \cdot T_{BURST}$ and $T_{INACTIVE} = (1-DC_{BURST}) \cdot T_{BURST}$. The average magnitude $I_{AVE}$ of the load current $I_{LOAD}$ may be dependent on the burst duty cycle $DC_{BURST}$. For example, the average magnitude $I_{AVE}$ of the load current $I_{LOAD}$ may equal the burst duty cycle $DC_{BURST}$ times the load current $I_{LOAD}$ (e.g., $I_{AVE} = DC_{BURST} \cdot I_{LOAD}$), which in one example may be the minimum load current $I_{MIN}$ (e.g., $I_{AVE} = DC_{BURST} \cdot I_{MIN}$).

The burst duty cycle $DC_{BURST}$ may be controlled to adjust the average magnitude $I_{AVE}$ of the load current $I_{LOAD}$. For example, the burst mode period $T_{BURST}$ may be held constant and the length of the active state period $T_{ACTIVE}$ may be varied to adjust the duty cycle $DC_{BURST}$, which in turn may vary the average magnitude $I_{AVE}$ of the load current $I_{LOAD}$. The active state period $T_{ACTIVE}$ may be held constant, and the length of burst mode period $T_{BURST}$ may be varied to adjust the burst duty cycle $DC_{BURST}$, which in turn may vary the average magnitude $I_{AVE}$ of the load current $I_{LOAD}$. Accordingly, as the burst duty cycle $DC_{BURST}$ is increased, the average magnitude $I_{AVE}$ of the load current $I_{LOAD}$ may increase, and as the burst duty cycle $DC_{BURST}$ is decreased, the average magnitude $I_{AVE}$ of the load current $I_{LOAD}$ may decrease.

Figure 12A:
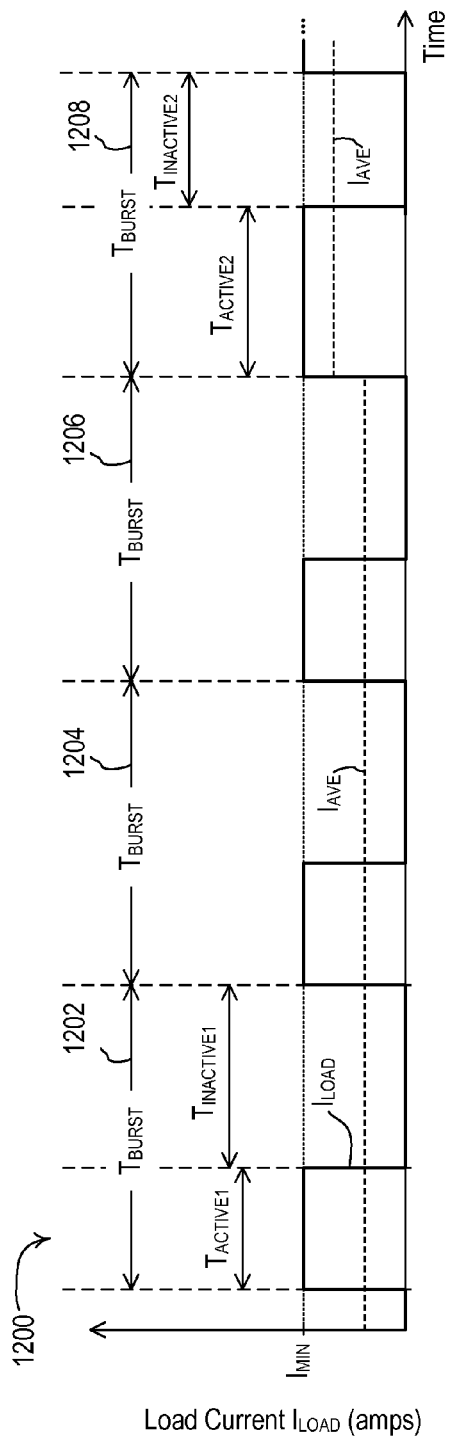
FIG. 12A is a diagram of an example waveform illustrating the load current $I_{LOAD}$ when a load regulation circuit is operating in a burst mode.

FIG. 12A is a diagram of an example waveform 1200 illustrating the load current $I_{LOAD}$ when a load regulation circuit (e.g., the load regulation circuit 140) is operating in a burst mode, for example, as the target intensity $L_{TRGT}$ of a light source (e.g., the LED light source 202) is increased (e.g., from the low-end intensity $L_{LE}$). A control circuit (e.g., the control circuit 150 of the LED driver 100 shown in FIG. 1 and/or the control circuit 150 controlling the forward converter 240 and the current sense circuit 260 shown in FIG. 5) may adjust the length of the active state period $T_{ACTIVE}$ of the burst mode period $T_{BURST}$ by adjusting the burst duty cycle $DC_{BURST}$. Adjusting the length of the active state period $T_{ACTIVE}$ may adjust the average magnitude $I_{AVE}$ of the load current $I_{LOAD}$, and in turn the intensity of the light source.

The active state period $T_{ACTIVE}$ of the load current $I_{LOAD}$ may have a length that is dependent upon the length of an inverter cycle of the inverter circuit of the load regulation circuit (i.e., the operating period $T_{OP}$). For example, referring to FIG. 11, the active state period $T_{ACTIVE}$ may comprise six inverter cycles, and as such, has a length that is equal to the duration of the six inverter cycles. The control circuit may adjust (i.e., increase or decrease) the active state periods $T_{ACTIVE}$ by adjusting the number of inverter cycles in the active state period $T_{ACTIVE}$. As such, the control circuit may adjust the active state periods $T_{ACTIVE}$ by predetermined time intervals that correspond to the length of an inverter cycle of the inverter circuit of the load regulation circuit, for example, the transition operating period $T_{OP-T}$ (e.g., approximately 12.8 microseconds). Therefore, the active state period $T_{ACTIVE}$ may be characterized by one or more inverter cycles, and may be adjusted by adjusting a number of inverter cycles per active state period $T_{ACTIVE}$. As such, the average magnitude $I_{AVE}$ of the load current $I_{LOAD}$ may be adjusted by predetermined increments, for example, corresponding to a change in load current $I_{LOAD}$ due to an increase or decrease of an inverter cycle per active state period $T_{ACTIVE}$.

One or more burst mode periods $T_{BURST}$ of the load regulation circuit may be characterized by active state periods $T_{ACTIVE}$ that comprise the same number of inverter cycles. In the example of FIG. 12A, three burst mode periods $T_{BURST}$ 1202, 1204, 1206 may be characterized by equivalent active state periods $T_{ACTIVE1}$ (i.e., active state periods $T_{ACTIVE1}$ that have the same number of inverter cycles). The active state period $T_{ACTIVE2}$ of the burst mode period $T_{BURST}$ 1208 may be larger than the active state periods $T_{ACTIVE1}$ of the other burst mode periods $T_{BURST}$ 1202, 1204, 1206. In other words, the active state period $T_{ACTIVE2}$ during the burst mode period $T_{BURST}$ 1208 may be increased as compared to the active state periods $T_{ACTIVE1}$ during the burst mode periods $T_{BURST}$ 1202, 1204, 1206. As such, the average magnitude $I_{AVE}$ of the load current $I_{LOAD}$ may be increased in accordance with the additional inverter cycle(s) of the active state period $T_{ACTIVE2}$ during the burst mode period $T_{BURST}$ 1208. Therefore, the control circuit may adjust (i.e., increase or decrease) the average magnitude $I_{AVE}$ of the load current $I_{LOAD}$ by adjusting the active state period $T_{ACTIVE}$ by increments of one or more inverter cycles.

Figure 12B:
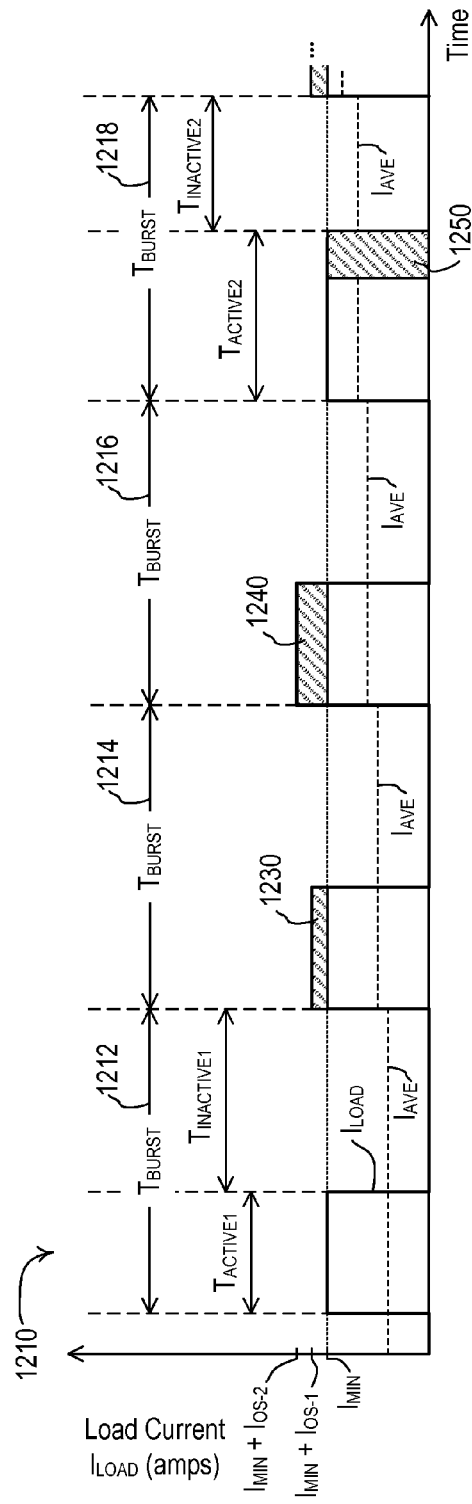
FIG. 12B is a diagram of an example waveform illustrating the load current $I_{LOAD}$ when a load regulation circuit is operating in a burst mode.

FIG. 12B is a diagram of an example waveform 1210 illustrating the load current $I_{LOAD}$ when a load regulation circuit (e.g., the load regulation circuit 140) is operating in a burst mode, for example, as the target intensity $L_{TRGT}$ of a light source (e.g., the LED light source 202) is increased (e.g., from the low-end intensity $L_{LE}$). As noted herein, a control circuit (e.g., the control circuit 150 of the LED driver 100 shown in FIG. 1 and/or the control circuit 150 controlling the forward converter 240 and the current sense circuit 260 shown in FIG. 5) may adjust the average magnitude $I_{AVE}$ of the load current $I_{LOAD}$ by adjusting the active state period $T_{ACTIVE}$ (i.e., the number of inverter cycles per active state period $T_{ACTIVE}$). When adjusting only the active state period $T_{ACTIVE}$ (e.g., and in turn the burst duty cycle $DC_{BURST}$) near the low-end intensity $L_{LE}$, the adjustment of the average magnitude $I_{AVE}$ of the load current $I_{LOAD}$ may cause changes in the intensity of the lighting load that are visibly perceptible to the user (e.g., as shown in FIG. 12A).

The control circuit may also adjust (i.e., increase or decrease) the magnitude of the load current $I_{LOAD}$ between and/or during adjustments of the active state period $T_{ACTIVE}$ while in the burst mode, for example, to adjust the average magnitude $I_{AVE}$ of the load current $I_{LOAD}$ with finer granularity as compared to adjusting only the active state period $T_{ACTIVE}$ (e.g., to provide finer tuning of the intensity of the lighting load). The control circuit may adjust (i.e., increase or decrease) the magnitude of the load current $I_{LOAD}$ by adjusting the target load current $I_{TRGT}$ and by controlling the inverter circuit to regulate the load current $I_{LOAD}$ to the target load current $I_{TRGT}$ during the active state periods $T_{ACTIVE}$, for example, as described herein. The control circuit may adjust the load current $I_{LOAD}$ linearly, variably as a function of the average magnitude $I_{AVE}$ of the load current $I_{LOAD}$, and/or by predetermined amounts. As such, the control circuit may ease the transitions between adjustments of the active state period $T_{ACTIVE}$ by adjusting the load current $I_{LOAD}$.

The control circuit may adjust the target load current $I_{TRGT}$ by a current offset $I_{OS}$, for example, between adjustments of the active state period $T_{ACTIVE}$ and/or when adjusting the active state period $T_{ACTIVE}$. The current offset $I_{OS}$ may range (i.e., vary) between a minimum current offset $I_{OS-MIN}$ and a maximum current offset $I_{OS-MAX}$, for example, based on the burst duty cycle $DC_{BURST}$. The value of the current offset $I_{OS}$ may be determined based on the minimum rated current $I_{MIN}$, the target current $I_{TRGT}$, the target intensity $L_{TRGT}$, the burst duty cycle $DC_{BURST}$, and/or the active state period $T_{ACTIVE}$. The current offset $I_{OS}$ may be variable between burst mode periods $T_{BURST}$ having the same active state period $T_{ACTIVE}$ and/or between burst mode periods $T_{BURST}$ having the different active state periods $T_{ACTIVE}$.

Referring to FIG. 12B, the control circuit may increase the intensity of the light source at a constant rate. The control circuit may hold the active state period $T_{ACTIVE}$ of two or more burst mode periods $T_{BURST}$ constant, and may adjust the load current $I_{LOAD}$ of the active state periods $T_{ACTIVE}$ of the two or more burst mode periods $T_{BURST}$, for example, by a consistent or varying current offset $I_{OS}$. For example, the control circuit may hold the active state period $T_{ACTIVE1}$ (i.e., the number of inverter cycles of the active state period $T_{ACTIVE1}$) of the burst mode periods $T_{BURST}$ 1212, 1214, 1216 constant as shown in FIG. 12B. The control circuit may set the load current $I_{LOAD}$ during the active state period $T_{ACTIVE1}$ of the burst mode period $T_{BURST}$ 1212 to the minimum rated current $I_{MIN}$. The control circuit may increase the load current $I_{LOAD}$ of the active state period $T_{ACTIVE1}$ of the burst mode period $T_{BURST}$ 1214 by a current offset $I_{OS-1}$ while holding the active state period $T_{ACTIVE1}$ constant. The control circuit may then increase the load current $I_{LOAD}$ of the active state period $T_{ACTIVE1}$ of the burst mode period $T_{BURST}$ 1216 by a current offset $I_{OS-2}$ while holding the active state period $T_{ACTIVE1}$ constant. The current offset $I_{OS-2}$ may be greater than the current offset $I_{OS-1}$. The current offset $I_{OS-2}$ may be equal to, greater than, or less than twice the current offset $I_{OS-1}$. For example, the current offset $I_{OS-2}$ may be equal to twice the current offset $I_{OS-1}$ if the intensity of the light source is being increased at a constant rate. The control circuit may increase the average magnitude $I_{AVE}$ of the load current $I_{LOAD}$ during the burst mode periods $T_{BURST}$ 1212, 1214, 1216 while holding the active state period $T_{ACTIVE1}$ constant.

The control circuit may adjust the active state period $T_{ACTIVE}$ and the load current $I_{LOAD}$ of a subsequent burst mode period $T_{BURST}$. For example, the control circuit may increase the active state period $T_{ACTIVE2}$ of the burst mode period $T_{BURST}$ 1218 and decrease the load current $I_{LOAD}$ of the active state period $T_{ACTIVE2}$ of the burst mode period $T_{BURST}$ 1218. The control circuit may increase the active state period $T_{ACTIVE2}$ of the burst mode period $T_{BURST}$ 1218 by one inverter cycle, and may set the load current $I_{LOAD}$ of the active state period $T_{ACTIVE2}$ of the burst mode period $T_{BURST}$ 1218 to the minimum rated current $I_{MIN}$. Although the load current $I_{LOAD}$ of the active state period $T_{ACTIVE2}$ of the burst mode period $T_{BURST}$ 1218 is decreased, the average magnitude $I_{AVE}$ of the load current $I_{LOAD}$ is increased due to the increase in the active state period $T_{ACTIVE2}$. As such, the control circuit may control (e.g., increase or decrease) the average magnitude $I_{AVE}$ of the load current $I_{LOAD}$ with finer granularity by adjusting both the load current $I_{LOAD}$ and the active state period $T_{ACTIVE}$ during burst mode.

When increasing the active state period $T_{ACTIVE}$, the average magnitude $I_{AVE}$ of the load current $I_{LOAD}$ may be increased due to the application of the load current $I_{LOAD}$ for a greater duration of the burst mode period $T_{BURST}$. For example, this may be illustrated by 1250 in FIG. 12B. When increasing the load current $I_{LOAD}$ during burst mode periods $T_{BURST}$ having the same active state period $T_{ACTIVE}$, the load current $I_{LOAD}$ may be increased in excess of the minimum load current $I_{MIN}$ by the current offset $I_{OS}$ (e.g., which may vary between the minimum current offset $I_{OS-MIN}$ and the maximum current offset $I_{OS-MAX}$). As such, the average magnitude $I_{AVE}$ of the load current $I_{LOAD}$ may be increased due to the application of the current offset $I_{OS}$ in excess of the minimum load current $I_{MIN}$ for the active state period $T_{ACTIVE}$, for example, as illustrated by 1230 and 1240 in FIG. 12B.

When determining the value of the current offset $I_{OS}$ for a particular burst mode period $T_{BURST}$, the control circuit may ensure that the change (e.g., increase or decrease) in the average magnitude $I_{AVE}$ of the load current $I_{LOAD}$ due to the application of the current offset $I_{OS}$ does not exceed the change (e.g., increase or decrease) in the average magnitude $I_{AVE}$ of the load current $I_{LOAD}$ due to the application of the load current $I_{LOAD}$ for a greater duration of time during the burst mode period $T_{BURST}$ (i.e., an increase in the active state period $T_{ACTIVE}$). For example, referring to FIG. 12B, the control circuit may determine the current offset $I_{OS-1}$ such that the change in the average magnitude $I_{AVE}$ of the load current $I_{LOAD}$ 1230 due to the current offset $I_{OS-1}$ is less than the change in the average magnitude $I_{AVE}$ of the load current $I_{LOAD}$ 1240 due to the current offset $I_{OS-2}$. Similarly, the control circuit may determine the current offset $I_{OS-2}$ such that the change in the average magnitude $I_{AVE}$ of the load current $I_{LOAD}$ 1240 due to the current offset $I_{OS-2}$ is greater than the change in the average magnitude $I_{AVE}$ of the load current $I_{LOAD}$ 1230 due to the current offset $I_{OS-1}$ and is less than the increase in the average magnitude $I_{AVE}$ of the load current $I_{LOAD}$ 1250 due to the application of the load current $I_{LOAD}$ for a greater duration of time during the burst mode period $T_{BURST}$ (i.e., the difference between the active state period $T_{ACTIVE1}$ and the active state period $T_{ACTIVE2}$). This may allow the control circuit may ease the transitions between adjustments of the active state period $T_{ACTIVE}$ (e.g., from the active state period $T_{ACTIVE1}$ to the active state period $T_{ACTIVE2}$) by adjusting the load current $I_{LOAD}$ by a current offset $I_{OS}$.

Figure 12C:
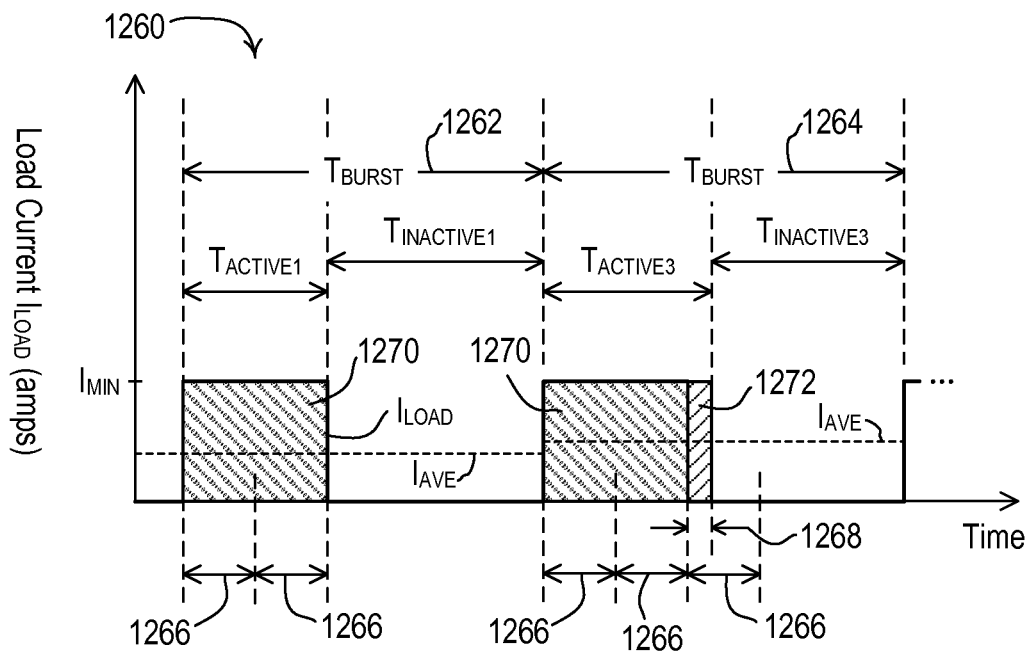
FIG. 12C is example waveforms illustrating an example of how a load control circuit may determine the current offset when holding the active state period constant during burst mode.
Figure 12C:
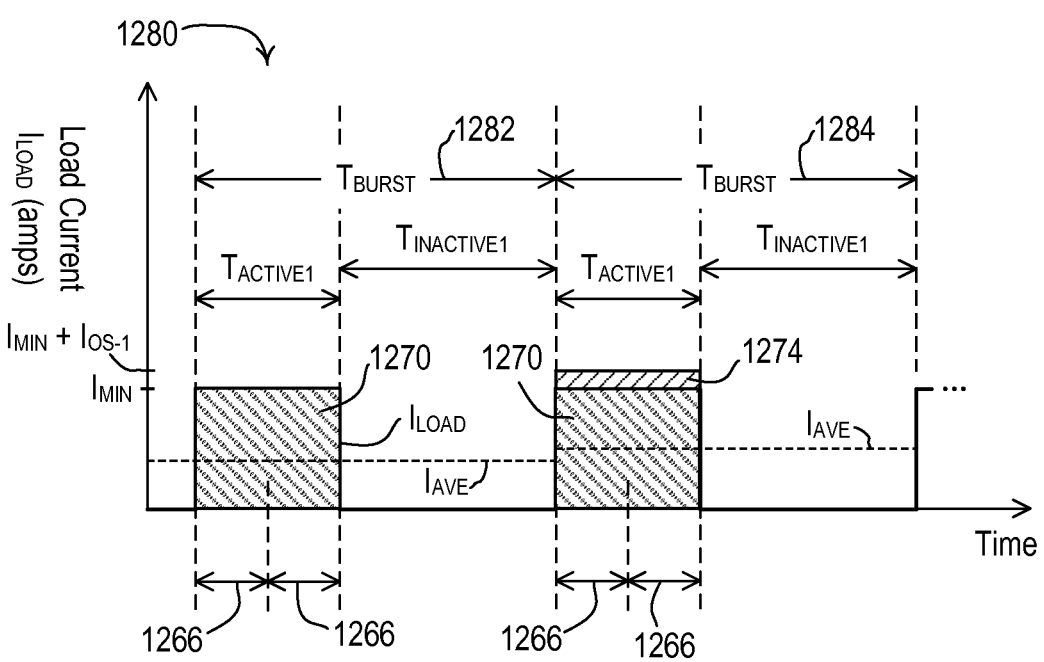

FIG. 12C shows example waveforms 1260, 1280 illustrating an example of how a load control circuit (e.g., the control circuit 150 of the LED driver 100 shown in FIG. 1 and/or the control circuit 150 controlling the forward converter 240 and the current sense circuit 260 shown in FIG. 5) may determine the current offset $I_{OS}$ when holding the active state period $T_{ACTIVE}$ constant during burst mode, for example, as the target intensity $L_{TRGT}$ of a light source (e.g., the LED light source 202) is increased from the low-end intensity $L_{LE}$. As noted herein, the burst duty cycle $DC_{BURST}$ (i.e., $DC_{BURST-INTEGER}$) and in turn the active state period $T_{ACTIVE}$ may be characterized by one or more inverter cycles.

Referring to example waveform 1260, the active state period $T_{ACTIVE1}$ of the burst mode period $T_{BURST}$ 1262 may be characterized by two inverter cycles 1266. In a subsequent burst mode period $T_{BURST}$ 1264, the control circuit may determine to adjust the average magnitude $I_{AVE}$ of the load current $I_{LOAD}$, for example, in accordance with the target intensity $I_{TRGT}$. For example, the control circuit may determine to increase the active state period $T_{ACTIVE3}$ of the burst mode period $T_{BURST}$ 1264 by less than one inverter cycle to achieve the increase in the average magnitude $I_{AVE}$ of the load current $I_{LOAD}$. As such, the active state period $T_{ACTIVE3}$ of the burst mode period $T_{BURST}$ 1264 may be characterized by two inverter cycles 1266 and a fractional portion 1268 of a third inverter cycle 1266, where for example, the increase in the average magnitude $I_{AVE}$ of the load current $I_{LOAD}$ during the burst mode period $T_{BURST}$ 1264 may be due to the fractional portion 1268 of the third inverter cycle 1266.

As described herein, the ideal burst duty cycle $DC_{BURST-IDEAL}$ of a burst mode period $T_{BURST}$ may be characterized by an integer portion $DC_{BURST-INTEGER}$ and/or a fractional portion $DC_{BURST-FRACTIONAL}$. For example, the ideal burst duty cycle $DC_{BURST-IDEAL}$ may follow the ideal curve shown in FIG. 3 (e.g., the ideal burst duty cycle $DC_{BURST-IDEAL}$ may result in the active state period $T_{ACTIVE3}$). The integer portion $DC_{BURST-INTEGER}$ may be characterized by the percentage of the ideal burst duty cycle $DC_{BURST-IDEAL}$ that includes complete inverter cycles. The fractional portion $DC_{BURST-FRACTIONAL}$ may be characterized by the percentage of the ideal burst duty cycle $DC_{BURST-IDEAL}$ that includes a fraction of an inverter cycle. For example, as shown in FIG. 12C, the ideal burst duty cycle $DC_{BURST-IDEAL}$ of the burst mode period $T_{BURST}$ 1262 may include an integer portion $DC_{BURST-INTEGER}$ 1270 (which may be characterized by two inverter cycles 1266), but not include a fractional portion $DC_{BURST-FRACTIONAL}$. The ideal burst duty cycle $DC_{BURST-IDEAL}$ of the burst mode period $T_{BURST}$ 1264 may include an integer portion $DC_{BURST-INTEGER}$ 1270 (which may be characterized by two inverter cycles 1266) and a fractional portion $DC_{BURST-FRACTIONAL}$ 1272 (which may be characterized by the fractional portion 1268 of the third inverter cycle 1266).

However, the control circuit may be configured to adjust the number of inverter cycles only by an integer number (i.e., by complete inverter cycles) and not by a fractional amount. Therefore, the control circuit may be unable to increase the active state period $T_{ACTIVE3}$ of the burst mode period $T_{BURST}$ 1264 by the fractional portion 1268 and in turn increase the burst duty cycle $DC_{BURST}$ of the burst mode period $T_{BURST}$ 1264 by the fractional portion $DC_{BURST-FRACTIONAL}$ 1272 to increase the average magnitude $I_{AVE}$ of the load current $I_{LOAD}$. The control circuit may adjust the magnitude of the load current $I_{LOAD}$ by the current offset $I_{OS}$ to compensate for not being able to adjust the number of inverter cycles by a fractional amount, for example, as described with reference to FIG. 15.

As noted above, during burst mode, the control circuit may increase the load current $I_{LOAD}$ of an active state period $T_{ACTIVE}$ by a current offset $I_{OS}$ in order to increase the average magnitude $I_{AVE}$ of the load current $I_{LOAD}$ to achieve the target intensity $L_{TRGT}$. The control circuit may determine the current offset $I_{OS}$ based on the fractional portion $DC_{BURST-FRACTIONAL}$ of the ideal burst duty cycle $DC_{BURST-IDEAL}$ for the burst mode period $T_{BURST}$, for example, assuming that the control circuit could in fact adjust the number of inverter cycles by a fractional amount. For example, referring to the waveform 1280, the control circuit may determine the current offset $I_{OS-1}$ based on the fractional portion $DC_{BURST-FRACTIONAL}$ 1272 of the ideal burst duty cycle $DC_{BURST-IDEAL}$ of the burst mode period $T_{BURST}$ 1264 from waveform 1260. That is, the control circuit may determine the current offset $I_{OS-1}$ such that an increase 1274 in the load current $I_{LOAD}$ over the active state period $T_{ACTIVE}$ due to the current offset $I_{OS-1}$ may be equal to (i.e., result in the same adjustment to the average magnitude $I_{AVE}$ of the load current $I_{LOAD}$) the fractional portion $DC_{BURST-FRACTIONAL}$ 1272. Therefore, the control circuit may adjust the magnitude of the load current $I_{LOAD}$ by the current offset $I_{OS}$ (e.g., current offset $I_{OS-1}$) to compensate for not being able to adjust the number of inverter cycles by a fractional amount (e.g., the fractional portion $DC_{BURST-FRACTIONAL}$ 1272).

FIG. 13 is an example of a plot relationship between the target load current $I_{TRGT}$ and the burst duty cycle $DC_{BURST}$, and the target intensity $L_{TRGT}$ of a light source (e.g., the LED light source 202), for example, when a load regulation circuit (e.g., the load regulation circuit 140) is operating in a burst mode and when the load current $I_{LOAD}$ of the light source is near the low-end intensity $L_{LE}$. Graph 1300 is an example plot of a relationship between the target load current $I_{TRGT}$ and the target intensity $L_{TRGT}$ of the light source. Graph 1310 is an example plot of a relationship between the burst duty cycle $DC_{BURST}$ (i.e., the integer portion of the ideal burst duty cycle $DC_{BURST-INTEGER}$) and the target intensity $L_{TRGT}$ of the light source. In the graph 1300 and 1310, the target intensity may range from the transition intensity $L_{TRAN}$ to the low-end intensity $L_{LE}$.

A control circuit (e.g., the control circuit 150 of the LED driver 100 shown in FIG. 1 and/or the control circuit 150 controlling the forward converter 240 and the current sense circuit 260 shown in FIG. 5) may determine the magnitude of the target load current $I_{TRGT}$ and/or the burst duty cycle $DC_{BURST}$ during burst mode, for example, based on the target intensity $L_{TRGT}$. The control circuit may determine the target intensity $L_{TRGT}$, for example, via a digital message received via the communication circuit 180, via a phase-control signal received from a dimmer switch, and/or the like. The target intensity $L_{TRGT}$ may be constant or may be changing (e.g., fading) from one intensity level to another. The control circuit may determine the burst duty cycle $DC_{BURST}$ based on the target intensity $L_{TRGT}$. After determining the burst duty cycle $DC_{BURST}$, the control circuit may determine the target load current $I_{TRGT}$ that may be used with the burst duty cycle $DC_{BURST}$ such that the light source is driven to the target intensity $L_{TRGT}$. The control circuit may determine the burst duty cycle $DC_{BURST}$ and/or the target load current $I_{TRGT}$ by calculating the values in real-time (e.g., as described with reference to FIG. 15) and/or retrieving the values from memory (e.g., via a lookup table or the like).

The control circuit may apply a particular burst duty cycle $DC_{BURST}$ (i.e., $DC_{BURST\text{-}INTEGER}$) for a range of target intensities $L_{TRGT}$. The control circuit may determine the target load current $I_{TRGT}$ across the range of target intensities $L_{TRGT}$ for the particular burst duty cycle $DC_{BURST}$, for example, according to a target load current $I_{TRGT}$ profile. The target load current $I_{TRGT}$ profile may vary linearly across the range of target intensities $L_{TRGT}$ for the particular burst duty cycle $DC_{BURST}$. The target load current $I_{TRGT}$ profile that may be applied across the range of target intensities $L_{TRGT}$ associated with a burst duty cycle $DC_{BURST}$ may be different for different burst duty cycles $DC_{BURST}$. For example, the target load current $I_{TRGT}$ may be adjusted from the minimum rated current $I_{MIN}$ to the minimum rated current $I_{MIN}$ plus the current offset $I_{OS}$, and the current offset $I_{OS}$ may range from the minimum current offset $I_{OS\text{-}MIN}$ to the maximum current offset $I_{OS\text{-}MAX}$ based on the burst duty cycle $DC_{BURST}$. For example, the larger the burst duty cycle $DC_{BURST}$, then the smaller range of current offsets $I_{OS}$ may be used in the target load current $I_{TRGT}$ profile, and vice versa. This may be done because the minimum rated current $I_{MIN}$ divided by the burst duty cycle $DC_{BURST}$ (i.e., $I_{MIN}/DC_{BURST}$) may be larger at smaller burst duty cycle $DC_{BURST}$ values. Further, this may be done because the user's sensitively to changes in intensity of the light source may be increased at lower light levels and a more granular adjustment of intensity of the lighting load may be desired at low-end.

Referring to FIG. 13, if the control circuit determines that the target intensity $L_{TRGT}$ falls within the range 1301, then the control circuit may determine to set the burst duty cycle $DC_{BURST}$ (i.e., $DC_{BURST\text{-}INTEGER}$) to $DC_{MAX}$, and the control circuit may determine to set the target load current $I_{LOAD}$ according to the target load current $I_{LOAD}$ profile 1321. The target load current $I_{LOAD}$ profile 1321 may range from the minimum rated current $I_{MIN}$ plus the minimum current offset $I_{OS\text{-}MIN}$ to the minimum rated current $I_{MIN}$ based on the target intensity $L_{TRGT}$. As noted above, the control circuit may determine the burst duty cycle $DC_{BURST}$ and/or the target load current $I_{TRGT}$ by calculating the values in real-time and/or retrieving the values from memory.

If the control circuit determines that the target intensity $L_{TRGT}$ falls within the range 1302, then the control circuit may determine to set the burst duty cycle $DC_{BURST}$ to 1312 (e.g., which may be less than the $DC_{MAX}$, and the control circuit may determine to set the target load current $I_{LOAD}$ according to the target load current $I_{LOAD}$ profile 1322. Similarly, if the control circuit determines that the target intensity $L_{TRGT}$ falls within one of the target intensity ranges 1303-1307, then the control circuit may determine to set the burst duty cycle $DC_{BURST}$ to one of 1313-1317 and determine to set the target load current $I_{LOAD}$ according to one of the target load current $I_{LOAD}$ profiles 1323-1327, respectively. The maximum target current for consecutive target load current $I_{LOAD}$ profiles may change by a constant amount (e.g., as shown in FIG. 13) or may change by varying amounts (e.g., increase as the target intensity range gets smaller). Further, more or less than seven burst duty cycles $DC_{BURST}$ (i.e., $DC_{MAX}$ through $DC_{MIN}$) may be provided between the transition intensity $L_{TRAN}$ and the low-end intensity $L_{LE}$.

When the LED driver is driving a high-power LED light source, the LED light source may conduct larger amounts of current through the LED driver, which may affect the operation of the LED driver when dimming to the low-end intensity $L_{LE}$ (e.g., approximately 1%). For example, the larger current conducted by the high-power LED light source may cause the load current $I_{LOAD}$ to overshoot the minimum rated current $I_{MIN}$ at the beginning of each active state period $T_{ACTIVE}$.

FIG. 14A shows an example waveform 1400 illustrating an overshoot 1402 in the load current $I_{LOAD}$, for example, when the LED driver is controlling a high-power LED light source. The overshoot 1402 may be the additional current in excess of the target load current $I_{TRGT}$. For example, the target load current $I_{TRGT}$ is the minimum rated current $I_{MIN}$ in FIG. 14B. Stated another way, the overshoot 1402 may be characterized by the rise in the magnitude of the load current $I_{LOAD}$ above the target load current $I_{TRGT}$ at the beginning of the active state period $T_{ACTIVE}$. Since the LED driver determines the burst duty cycle $DC_{BURST}$ (e.g., and thus the length of the active state period $T_{ACTIVE}$) using open loop control, the overshoot (e.g., the overshoot 1402) may cause the LED driver to deliver more power to the LED light source than intended. In turn, the overshoot 1402 may cause the average load current $I_{AVG}$ to increase in excess of what was intended, and thus the intensity of the LED driver may be greater than intended (e.g., greater than approximately 1%). In addition, the sharp rise in the magnitude of the load current $I_{LOAD}$ at the beginning of the active state period $T_{ACTIVE}$ (i.e., the overshoot 1402) may cause audible noise (e.g., buzzing) in the magnetic components of the load regulation circuit of the LED driver (e.g., in the transformer 220 and/or the inductor L226 of the load regulation circuit 240 shown in FIG. 5).

Figure 14B:
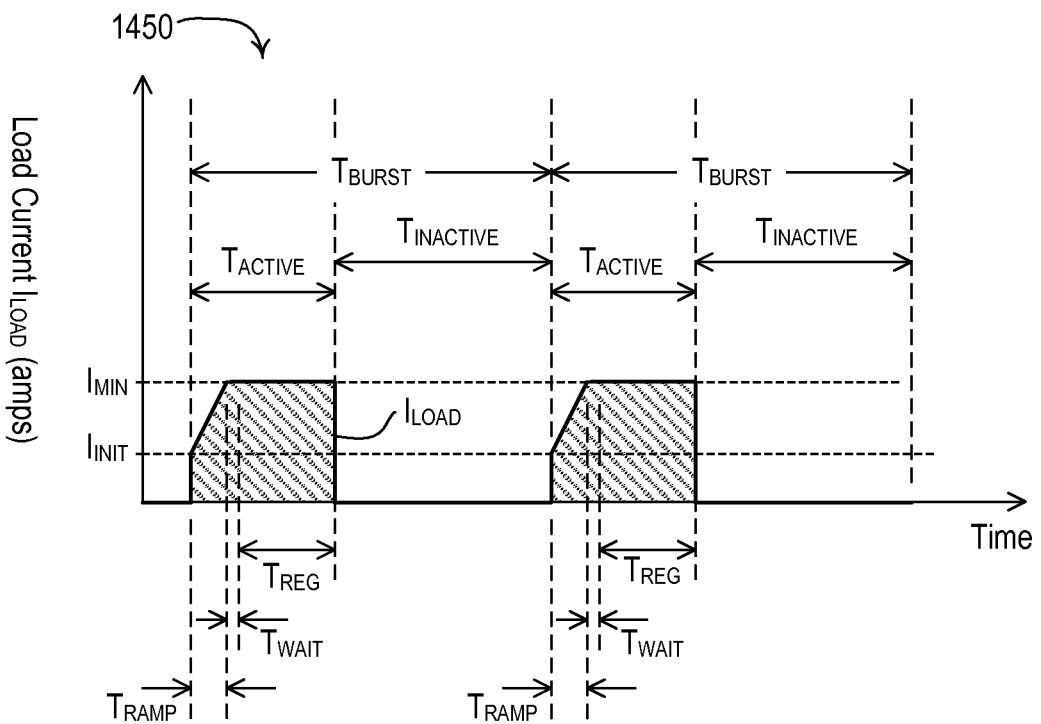
FIG. 14B is an example waveform illustrating control of a rise time of a load current conducted through a light source at the beginning of each active state period during burst mode.

Accordingly, the control circuit of the LED driver may be configured to control the rise time of the load current $I_{LOAD}$ at the beginning of each active state period $T_{ACTIVE}$. FIG. 14B shows an example waveform 1450 illustrating control of the rise time of the load current $I_{LOAD}$ at the beginning of each active state period $T_{ACTIVE}$. The control circuit 150 may detect an overshoot of the load current $I_{LOAD}$, for example, based on the load current $I_{LOAD}$ as determined by the load regulation circuit, based on the sense voltage $V_{SENSE}$, based on the load current feedback signal $V_{I\text{-}LOAD}$, and/or the like. The control circuit 150 may determine to control the rise time of the load current $I_{LOAD}$ at the beginning of an active state period $T_{ACTIVE}$. For example, the control circuit 150 may determine to control the rise time of the load current $I_{LOAD}$ to prevent the overshoot from continuing to occur. In one or more embodiments, the control circuit 150 may determine to control the rise time of the load current $I_{LOAD}$ at any time during operation and/or for any reason, for example, the control circuit 150 may be preconfigured to control of the rise time of the load current $I_{LOAD}$ at the beginning of each active state period $T_{ACTIVE}$. The control circuit 150 may determine the on times $T_{ON}$ of the drive control signals $V_{DRIVE1}$, $V_{DRIVE2}$ for controlling the inverter circuit of the forward converter 240 (e.g., using the load current feedback signal $V_{I\text{-}LOAD}$). The control circuit 150 may be configured to increase (e.g., ramp up) the load current $I_{LOAD}$ from an initial current $I_{INIT}$ to the target load current $I_{TRGT}$ (e.g., the minimum rated current $I_{MIN}$ or to the minimum rated current $I_{MIN}$ plus the current offset $I_{OS}$) over a ramp time period $T_{RAMP}$, for example, as shown in FIG. 14B. For example, the ramp time period $T_{RAMP}$ may be approximately 200 microseconds. In addition, the initial current $I_{INIT}$ may be approximately 40% of the rated minimum current $I_{MIN}$, but could range from zero amps to slightly less than the rated minimum current $I_{MIN}$.

Since the magnitude of the load current $I_{LOAD}$ is less than the minimum rated current $I_{MIN}$ during the ramp time period $T_{RAMP}$, the control circuit 150 does not regulate the magnitude of the load current $I_{LOAD}$ in response to the load current feedback signal $V_{I-LOAD}$ during the ramp time period $T_{RAMP}$. After freezing the control loop during the inactive state period $T_{INACTIVE}$, the control circuit 150 may maintain the control loop in the frozen state while the control circuit is adjusting the on times $T_{ON}$ of the drive control signals $V_{DRIVE1}$, $V_{DRIVE2}$ to ramp the load current $I_{LOAD}$ up to the target load current $I_{TRGT}$ during the ramp time period $T_{RAMP}$. After the ramp time period $T_{RAMP}$, the control circuit waits for a wait time period $T_{WAIT}$ (e.g., approximately 200 microseconds) before beginning to regulate the magnitude of the load current $I_{LOAD}$ during a regulation time period $T_{REG}$. As such, the control loop may be frozen for the duration of the inactive state period $T_{INACTIVE}$, the ramp time period $T_{RAMP}$, and the wait time period $T_{WAIT}$, and the control loop may be unfrozen (active) during the regulation time period $T_{REG}$. Ramping up the load current $I_{LOAD}$ during the active state $T_{ACTIVE}$ of the burst mode may prevent the load current $I_{LOAD}$ from overshooting the minimum rated current $I_{MIN}$ at the beginning of each active state period $T_{ACTIVE}$. The wait time period $T_{WAIT}$ may be used to allow for the load current $I_{LOAD}$ to stabilize. In one or more embodiments, the wait time period $T_{WAIT}$ may be omitted.

FIG. 14B may not be to scale. For example, in one or more embodiments, the ramp time period $T_{RAMP}$ may be approximately one quarter of a pulse width (e.g., approximately 200 microseconds), the wait time period $T_{WAIT}$ may be approximately one quarter of a pulse width (e.g., approximately 200 microseconds), and the regulation time period $T_{REG}$ may be approximately one half of a pulse width (e.g., approximately 200 microseconds). The invention is not so limited, and the ramp time period $T_{RAMP}$, the wait time period $T_{WAIT}$, and the regulation time period $T_{REG}$ may be in different proportions of the pulse width.

The target intensity $L_{TRGT}$ may be associated with a target amount of power delivered to the electrical load. For example, although the example illustrated in FIGS. 2 and 3 are with relation to target intensity $L_{TRGT}$, the control circuit (e.g., control circuit 150) may be configured to adjust the target load current $I_{TRGT}$ to control the target amount of power delivered to the electrical load and/or the control circuit may be configured to adjust the burst duty cycle $DC_{BURST}$ in response to the target amount of power when operating in the burst mode. For example, the control circuit may be configured to adjust the burst duty cycle $DC_{BURST}$ linearly with respect to the target amount of power when operating in the burst mode. Further, the control circuit may be configured to operate in the burst mode when the target amount of power is less than a transition amount of power. The transition amount of power may be power delivered to the electrical load when the electrical load is controlled to be the transition intensity $L_{TRAN}$.

FIGS. 15A, 15B, 16, 17A, 17B and 18 are simplified flowcharts of example procedures for operating a forward converter in a normal mode and a burst mode. The procedures of FIGS. 15A, 15B, 16, 17A, 17B, and 18 may be executed by a control circuit of a load control device (e.g., the control circuit 150 of the LED driver 100 shown in FIG. 1 and/or the control circuit 150 controlling the forward converter 240 and the current sense circuit 260 shown in FIG. 5).

Figure 15A:
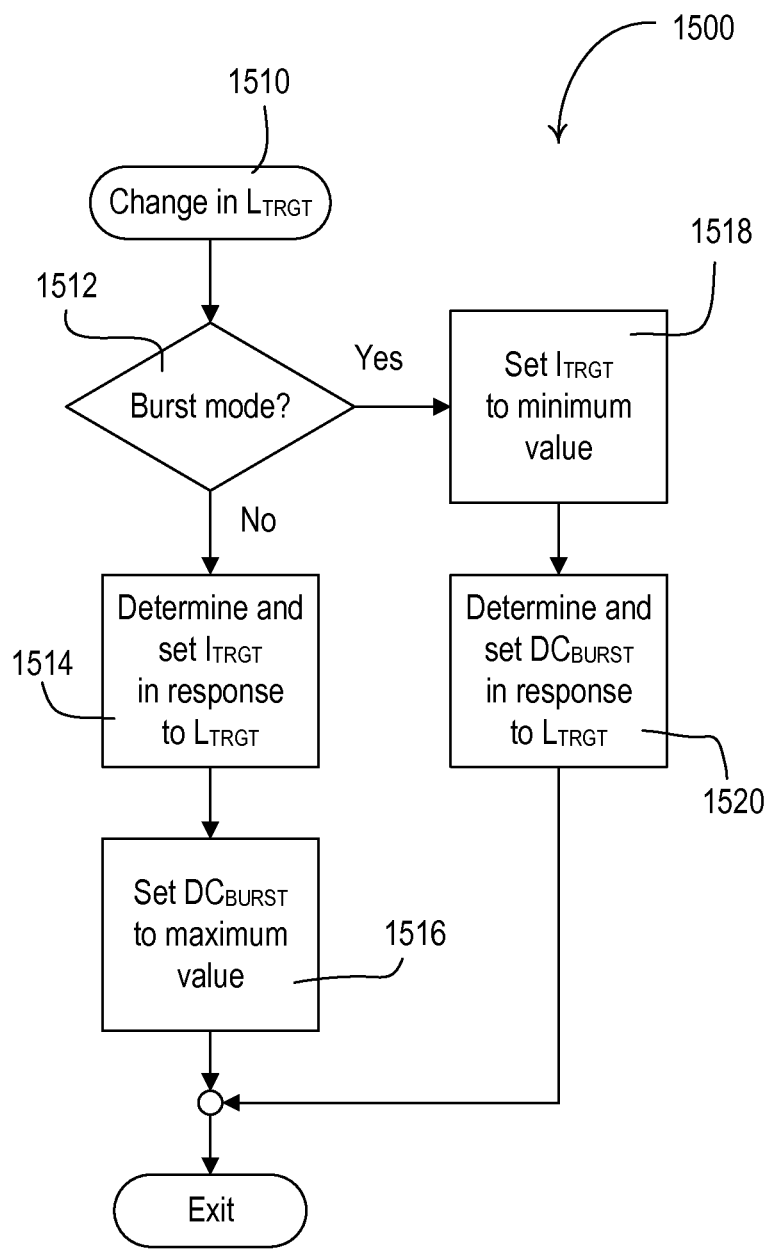
FIGS. 15A, 15B, 16, 17A, 17B, and 18 are simplified flowcharts of example procedures for operating a forward converter of an LED driver in a normal mode and a burst mode.

FIG. 15A is a simplified flowchart of an example target intensity procedure 1500 that may be executed when the target intensity $L_{TRGT}$ is adjusted at 1510 (e.g., in response to digital messages received via the communication circuit 180). The control circuit may determine if it is operating the forward converter in the burst mode at 1512 (e.g., the target intensity $L_{TRGT}$ is between the high-end intensity $L_{HE}$ and the transition intensity $L_{TRAN}$, i.e., $L_{TRAN} \leq L_{TRGT} \leq L_{HE}$). If the control circuit determines it is not operating the forward converter in the burst mode (e.g., but rather in the normal mode) at 1512, then the control circuit may determine and set the target load current $I_{TRGT}$ as a function of the target intensity $L_{TRGT}$ at 1514 (e.g., as shown in FIG. 2). The control circuit may then set the burst duty cycle $DC_{BURST}$ equal to a maximum duty cycle $DC_{MAX}$ (e.g., approximately 100%) at 1516 (e.g., as shown in FIG. 3), and the control circuit may exit the target intensity procedure 1500.

If the control circuit determines that it is operating the forward converter in the burst mode at 1512 (e.g., the target intensity $L_{TRGT}$ is below the transition intensity $L_{TRAN}$, i.e., $L_{TRGT} < L_{TRAN}$), then the control circuit may set the target load current $I_{TRGT}$ to a minimum value (e.g., to the minimum rated current $I_{MIN}$) at 1518 (e.g., as shown in FIG. 2). The control circuit may then determine and set the burst duty cycle $DC_{BURST}$ as a function of the target intensity $L_{TRGT}$ at 1520 (e.g., using open loop control as shown in FIG. 3), and the control circuit may exit the target intensity procedure 1500.

Figure 15B:
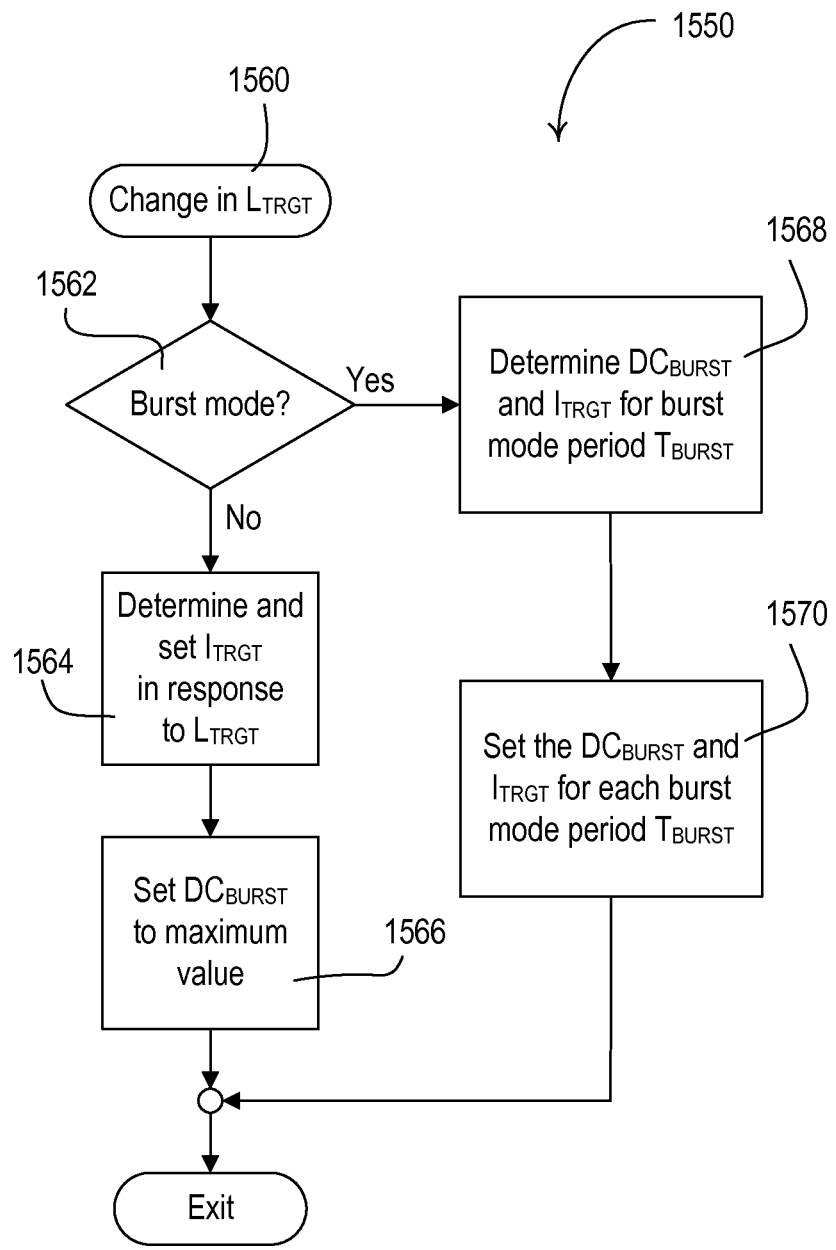

FIG. 15B is a simplified flowchart of an example target intensity procedure 1550 that may be executed when the target intensity $L_{TRGT}$ is adjusted at 1560 (e.g., in response to digital messages received via the communication circuit 180). The control circuit may determine if it is operating the forward converter in the burst mode at 1562 (e.g., the target intensity $L_{TRGT}$ is between the high-end intensity $L_{HE}$ and the transition intensity $L_{TRAN}$, i.e., $L_{TRAN} \leq L_{TRGT} \leq L_{HE}$). If the control circuit determines that it is not operating the forward converter in the burst mode (e.g., but rather in the normal mode), then the control circuit may determine and set the target load current $I_{TRGT}$ as a function of the target intensity $L_{TRGT}$ at 1564 (e.g., as shown in FIG. 2). The control circuit may then set the burst duty cycle $DC_{BURST}$ equal to a maximum duty cycle $DC_{MAX}$ (e.g., approximately 100%) at 1566 (e.g., as shown in FIG. 3), and the control circuit may exit the target intensity procedure 1550.

If the control circuit determines that it is operating the forward converter in the burst mode at 1562 (e.g., the target intensity $L_{TRGT}$ is below the transition intensity $L_{TRAN}$, i.e., $L_{TRGT} < L_{TRAN}$), then the control circuit may determine the burst duty cycle $DC_{BURST}$ and target load current $I_{TRGT}$ for one or more burst mode periods $T_{BURST}$ (e.g., using open loop control) at 1568. For example, the control circuit may determine the burst duty cycle $DC_{BURST}$ and/or the target load current $I_{TRGT}$ by calculating the values in real-time (e.g., as described with reference to FIG. 16) and/or retrieving the values from memory (e.g., via a lookup table or the like). The control circuit may determine the burst duty cycle $DC_{BURST}$ and target load current $I_{TRGT}$ for a plurality of burst mode periods $T_{BURST}$ that may be used when adjusting the intensity of the light load to the target intensity $L_{TRGT}$, for example, as described with reference to FIG. 12B and/or FIG. 13. The control circuit may then set the burst duty cycle $DC_{BURST}$ and target load current $I_{TRGT}$ for each of the plurality of burst mode periods $T_{BURST}$ at 1570, for example, until the intensity of the lighting load equals the target intensity $L_{TRGT}$, and the control circuit may exit the target intensity procedure 1550.

Figure 16:
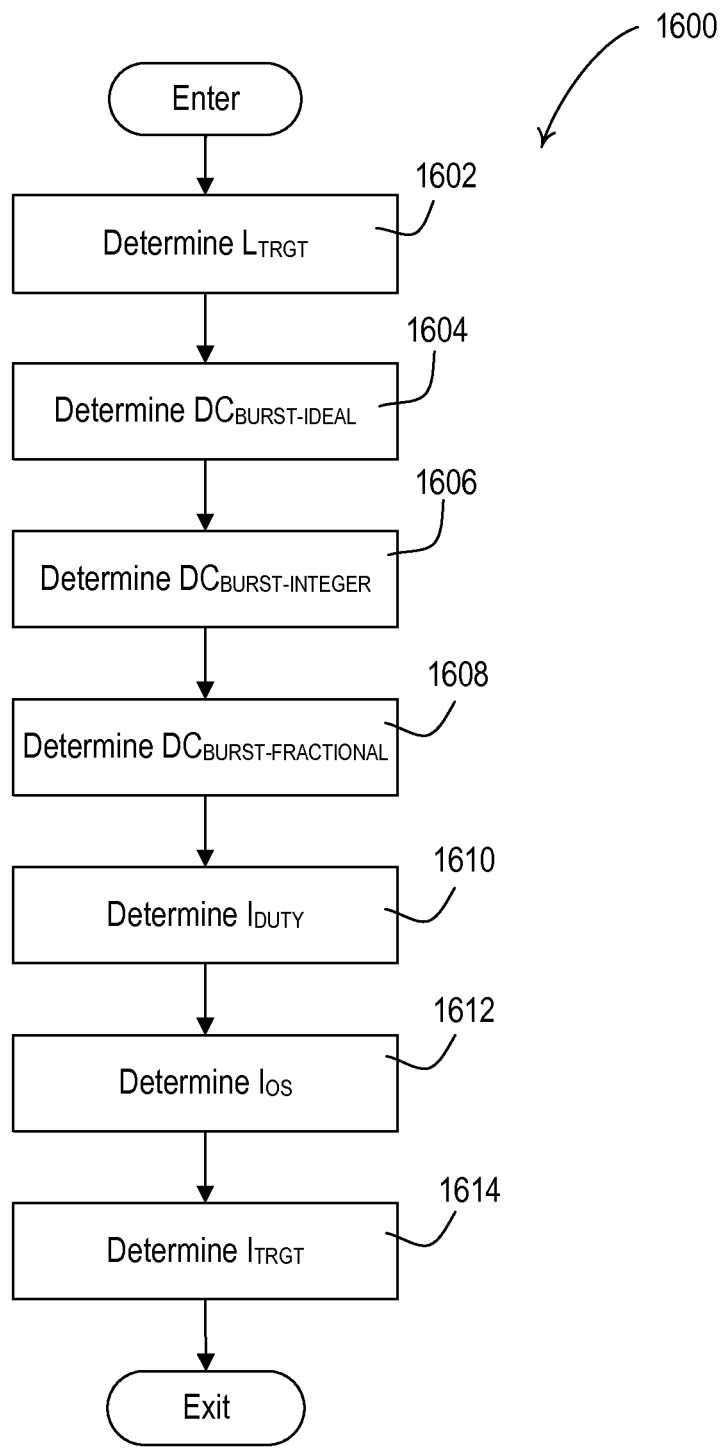

FIG. 16 is a simplified flowchart of an example target load current $I_{TRGT}$ procedure 1600. The target load current $I_{TRGT}$ procedure 1600 may be executed periodically (e.g., every 66 microseconds). In one or more embodiments, the target load current $I_{TRGT}$ procedure 1600 may be executed during 1568 of the target intensity procedure 1550. The control circuit may determine the burst duty cycle $DC_{BURST}$ (e.g., ideal burst duty cycle $DC_{BURST\text{-}IDEAL}$, integer portion of the ideal burst duty cycle $DC_{BURST\text{-}INTEGER}$, and/or fractional portion of the ideal burst duty cycle $DC_{BURST\text{-}FRACTIONAL}$), the current offset $I_{OS}$, and target load current $I_{TRGT}$ for controlling the lighting load at the beginning of every burst mode period $T_{BURST}$, for example, using the target load current $I_{TRGT}$ procedure 1600. The target load current $I_{TRGT}$ procedure 1600 may begin at 1602 where the control circuit may determine the target intensity $L_{TRGT}$. The control circuit may determine the target intensity $L_{TRGT}$, for example, via a digital message received via the communication circuit 180, via a phase-control signal received from a dimmer switch, and/or the like. The target intensity $L_{TRGT}$ may be constant or may be changing from one intensity level to another.

After determining the target intensity $L_{TRGT}$, the control circuit may determine the ideal burst duty cycle $DC_{BURST\text{-}IDEAL}$ at 1604. The ideal burst duty cycle $DC_{BURST\text{-}IDEAL}$ may be adjusted linearly as the target intensity $L_{TRGT}$ is adjusted between the low end intensity $L_{LE}$ and the transition intensity $L_{TRAN}$. For example, the control circuit may determine the ideal burst duty cycle $DC_{BURST\text{-}IDEAL}$ based on the target intensity $L_{TRGT}$ using the graph of FIG. 3. The ideal burst duty cycle $DC_{BURST\text{-}IDEAL}$ may include an integer portion $DC_{BURST\text{-}INTEGER}$ and/or a fractional portion $DC_{BURST\text{-}FRACTIONAL}$, for example, as described with reference to FIG. 12C.

The control circuit may determine the integer portion of the ideal burst duty cycle $DC_{BURST\text{-}INTEGER}$ at 1606. For example, the control circuit may determine the integer portion of the burst duty cycle $DC_{BURST\text{-}INTEGER}$ by rounding the ideal duty cycle $DC_{BURST\text{-}IDEAL}$ down to the next closest integer value using the following equation:

$$DC_{BURST\text{-}INTEGER} = \text{Round-Down}(DC_{BURST\text{-}IDEAL}).$$

The control circuit may determine the fractional portion of the ideal burst duty cycle $DC_{BURST\text{-}FRACTIONAL}$ at 1608. For example, the control circuit may determine the fractional portion of the ideal burst duty cycle $DC_{BURST\text{-}FRACTIONAL}$ by subtracting the integer portion of the burst duty cycle $DC_{BURST\text{-}INTEGER}$ from the ideal burst duty cycle $DC_{BURST\text{-}IDEAL}$, for example, using the following equation:

$$DC_{BURST\text{-}FRACTIONAL} = DC_{BURST\text{-}IDEAL} - DC_{BURST\text{-}INTEGER}.$$

As noted herein, the fractional portion of the ideal burst duty cycle $DC_{BURST\text{-}FRACTIONAL}$ may be characterized by the percentage of the ideal burst duty cycle $DC_{BURST\text{-}IDEAL}$ that includes a fraction of an inverter cycle. And since the control circuit may be configured to adjust the number of inverter cycles only by an integer number and not a fractional amount (i.e., by $DC_{BURST\text{-}FRACTIONAL}$), the control circuit may determine the current offset $I_{OS}$ for the burst mode period $T_{BURST}$ such that an increase in the load current $I_{LOAD}$ due to the current offset $I_{OS}$ may be equal to (i.e., result in the same adjustment to the average magnitude $I_{AVE}$ of the load current $I_{LOAD}$) the fractional portion $DC_{BURST\text{-}FRACTIONAL}$.

The control circuit may determine the average current $I_{DUTY}$ generated during a burst mode period $T_{BURST}$ having a burst duty cycle $DC_{BURST\text{-}CYCLE}$ that comprises one inverter cycle using the minimum rated current $I_{MIN}$ at 1610. The minimum rated current $I_{MIN}$ may be the peak current when the target intensity $L_{TRGT}$ is less than the transition intensity $L_{TRAN}$, for example, as shown in FIG. 2. For example, the control circuit may determine the average current $I_{DUTY}$ that is generated during a burst mode period $T_{BURST}$ having a burst duty cycle $DC_{BURST\text{-}CYCLE}$ that comprises one inverter cycle, for example according to the following equation:

$$I_{DUTY} = I_{MIN}/DC_{BURST\text{-}CYCLE}.$$

The control circuit may determine the current offset $I_{OS}$ according to the amount of current $I_{DUTY}$ generated during a burst duty cycle $DC_{BURST\text{-}CYCLE}$ that comprises one inverter cycle and the fractional portion of the ideal burst duty cycle $DC_{BURST\text{-}FRACTIONAL}$ at 1612. For example, the control circuit may multiply the fractional portion of the ideal burst duty cycle $DC_{BURST\text{-}FRACTIONAL}$ by the average current $I_{DUTY}$ generated during a burst mode period $T_{BURST}$ having a burst duty cycle $DC_{BURST\text{-}CYCLE}$ that comprises one inverter cycle to determine the current offset $I_{OS}$, for example, according to the following equation:

$$I_{OS} = I_{DUTY} \cdot DC_{BURST\text{-}FRACTIONAL}.$$

After determining the current offset $I_{OS}$, the control circuit may add the current offset $I_{OS}$ to the minimum rated current $I_{MIN}$ to determine the target current $I_{TRGT}$ for the target intensity $L_{TRGT}$ at 1614, and the control circuit may exit the target load current $I_{TRGT}$ procedure 1600. Since the control circuit may be configured to adjust the number of inverter cycles by an integer number and not a fractional amount, the control circuit may operate in burst mode by using the integer portion of the burst duty cycle $DC_{BURST\text{-}INTEGER}$, and by using the current offset $I_{OS}$ in lieu of the fractional portion of the ideal burst duty cycle $DC_{BURST\text{-}FRACTIONAL}$. As such, the control circuit may control the load current $I_{LOAD}$ to achieve the target intensity although it may not be able to operate at the ideal burst duty cycle $DC_{BURST\text{-}IDEAL}$.

In one or more embodiments, the control circuit may determine a scaled target intensity $L_{SCALED}$ and use the scaled target intensity $L_{SCALED}$ in lieu of the target intensity $L_{TRGT}$ when determining the ideal burst duty cycle $DC_{BURST\text{-}IDEAL}$ during the target load current $I_{TRGT}$ procedure 1600. For example, the may determine and use the scaled target intensity $L_{SCALED}$ when the low-end intensity $L_{LE}$ and/or the minimum burst duty cycle $DC_{MIN}$ are not zero (e.g., when the low-end intensity $L_{LE}$ is approximately in the range of 0.1%-1%). The scaled target intensity $L_{SCALED}$ may be based on the target intensity $L_{TRGT}$, the minimum burst duty cycle $DC_{MIN}$, and the maximum burst duty cycle $DC_{MAX}$. For example, the control circuit may determine the scaled target intensity $L_{SCALED}$ using the following equation:

$$L_{SCALED} = \frac{(L_{TRGT} - L_{LE}) \cdot (L_{TRAN} \cdot DC_{MAX} - L_{TRAN} \cdot DC_{MIN})}{(L_{TRAN} - L_{LE})} + L_{TRAN} \cdot DC_{MIN}.$$

After determining the scaled target intensity $L_{SCALED}$, the control circuit may determine the ideal burst duty cycle $DC_{BURST\text{-}IDEAL}$ based on the scaled target intensity $L_{SCALED}$, for example, at 1604, and the target load current $I_{TRGT}$ procedure 1600 may proceed as described herein. For example, the control circuit may determine the ideal burst duty cycle $DC_{BURST\text{-}IDEAL}$ based on the scaled target intensity $L_{SCALED}$ using the following equation:

$$DC_{BURST} = (L_{SCALED}/L_{TRAN}) * T_{BURST}$$

Figure 17A:
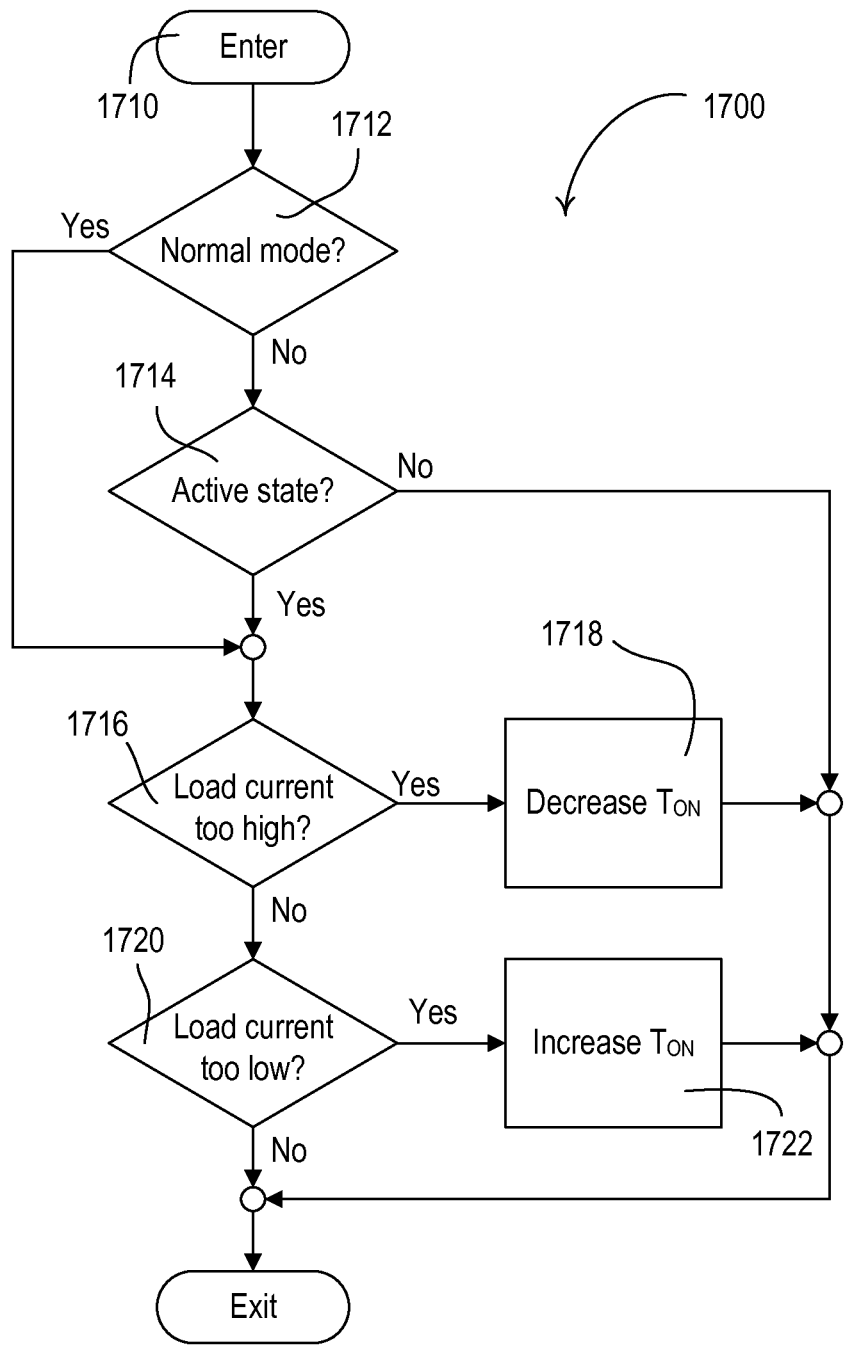

FIG. 17A is a simplified flowchart of an example control loop procedure 1700, which for example, may be executed periodically (e.g., every 66 microseconds). The control loop procedure 1700 may begin at 1710. For example, the control circuit may execute the control loop procedure 1700 to adjust the on time $T_{ON}$ of the drive control signals $V_{DRIVE1}$, $V_{DRIVE2}$ (e.g., and thus the duty cycle $DC_{INV}$ of the inverter voltage $V_{INV}$) in response to the magnitude of the load current $I_{LOAD}$ determined from the load current feedback signal $V_{I-LOAD}$ received from the current sense circuit. The control circuit may determine if it is operating the forward converter in the normal mode at 1712. If not, then the control circuit may determine if it is operating the forward converter in the active state of burst mode at 1714. If the control circuit is operating the forward converter in the normal mode or in the active state of burst mode, then the control circuit may adjust the on time $T_{ON}$ of the drive control signals $V_{DRIVE1}$, $V_{DRIVE2}$ in response to the load current feedback signal $V_{I-LOAD}$. For example, the control circuit may determine if the magnitude of the load current $I_{LOAD}$ is too high at 1716 (e.g., $I_{LOAD} > I_{TRGT}$). If the magnitude of the load current $I_{LOAD}$ is too high, the control circuit may decrease the on time $T_{ON}$ of the drive control signals $V_{DRIVE1}$, $V_{DRIVE2}$ at 1718. For example, at 1718, the control circuit may decrease the on time $T_{ON}$ by a predetermined amount or by an amount dependent upon the magnitude of the error between the target load current $I_{TRGT}$ and the magnitude of the load current $I_{LOAD}$. After decreasing the on time $T_{ON}$ of the drive control signals $V_{DRIVE1}$, $V_{DRIVE2}$, the control circuit may exit the control loop procedure 1700.

If the control circuit determines that the magnitude of the load current $I_{LOAD}$ is not too high at 1716, then the control circuit may determine whether the magnitude of the load current $I_{LOAD}$ is too low at 1720 (e.g., $I_{LOAD} < I_{TRGT}$). If the control circuit may determines that the magnitude of the load current $I_{LOAD}$ is too low, the control circuit may increase the on time $T_{ON}$ of the drive control signals $V_{DRIVE1}$, $V_{DRIVE2}$ at 1722. For example, at 1722, the control circuit may increase the on time $T_{ON}$ by a predetermined amount or by an amount dependent upon the magnitude of the error between the target load current $I_{TRGT}$ and the magnitude of the load current $I_{LOAD}$. After increasing the on time $T_{ON}$ of the drive control signals $V_{DRIVE1}$, $V_{DRIVE2}$, the control circuit may exit the control loop procedure 1700. If the control circuit determines that the magnitude of the load current $I_{LOAD}$ is not too high at 1716 and is not too low at 1720, the control circuit may exit the control loop procedure 1700.

If the control circuit is operating the forward converter in the inactive state of the burst mode, the control circuit may exit the control loop procedure 1700 without adjusting the on time $T_{ON}$ of the drive control signals $V_{DRIVE1}$, $V_{DRIVE2}$. Accordingly, the control circuit may freeze the control loop when in the inactive state of the burst mode by not adjusting the on time $T_{ON}$ of the drive control signals $V_{DRIVE1}$, $V_{DRIVE2}$ in response to the average magnitude $I_{AVE}$ of the load current $I_{LOAD}$. If the magnitude of the load current $I_{LOAD}$ is approximately zero amps during the inactive state, the control circuit may maintain the on time $T_{ON}$ of the drive control signals $V_{DRIVE1}$, $V_{DRIVE2}$ (e.g., as stored in the memory 170) to be equal to the last value of the on time from the previous active state. The control circuit may control the magnitude of the load current to the minimum rated current $I_{MIN}$ during the next active state.

Figure 17B:
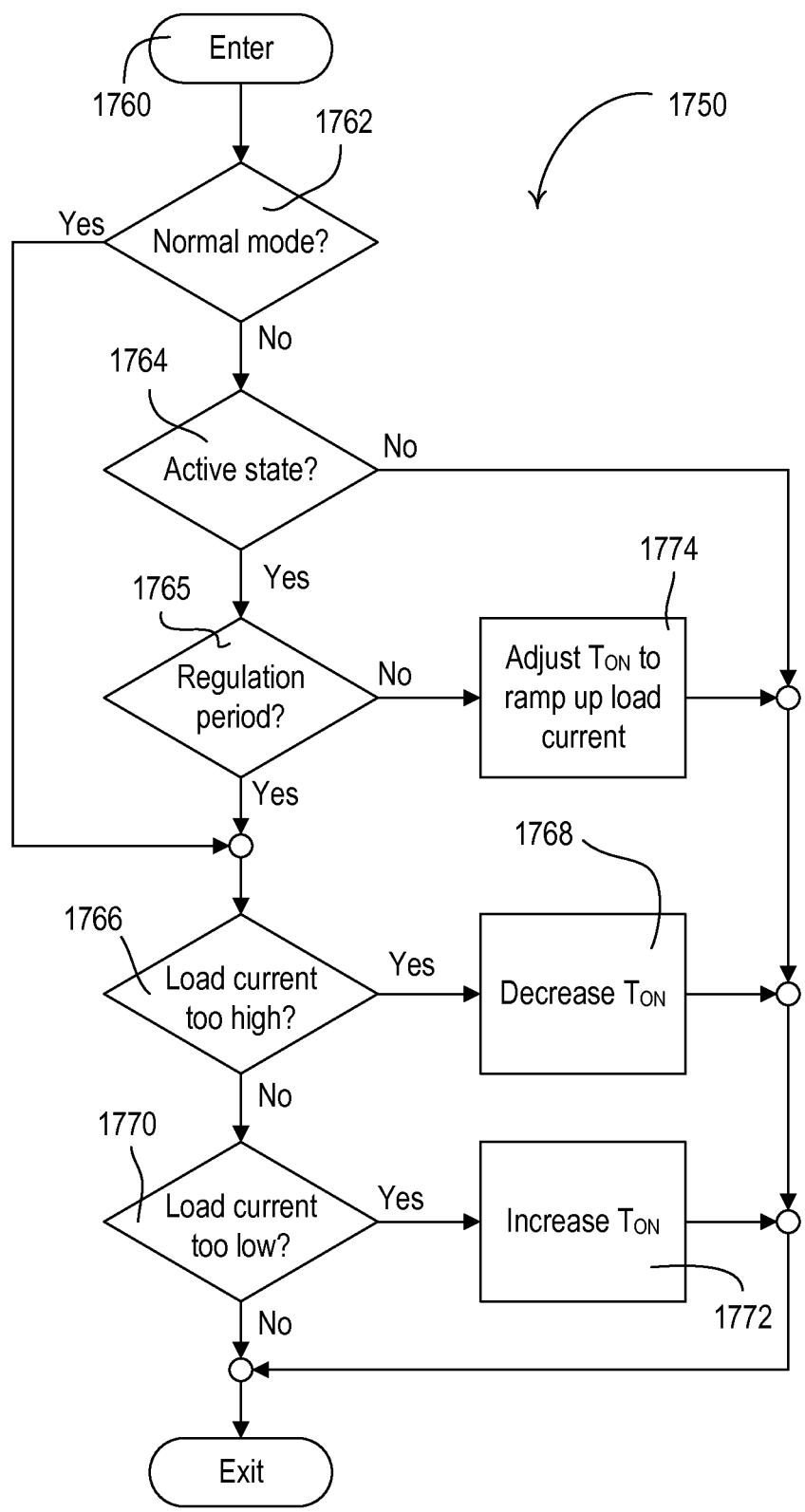

FIG. 17B is a simplified flowchart of an example control loop procedure 1750, which for example, may be executed periodically (e.g., every 66 microseconds). For example, the control loop procedure 1750 may be executed by the control circuit to avoid overshoot in the load current $I_{LOAD}$ at the beginning of each active state period $T_{ACTIVE}$ by ramping up the load current $I_{LOAD}$ (e.g., as shown in FIG. 14B). The control loop procedure 1750 may begin at 1760. The control circuit may determine if it is operating the forward converter in the normal mode at 1762. If not, then the control circuit may determine if it is operating the forward converter in the active state of burst mode at 1764. If the control circuit is operating the forward converter in the active state of the burst mode at 1764, the control circuit may then determine at 1765 if it should be presently regulating the load current (e.g., if it is operating in the regulation time period $T_{REG}$ as shown in FIG. 14B).

If the control circuit is operating the forward converter in the normal mode or in the regulation time period $T_{REG}$ of the active state of burst mode, then the control circuit may adjust the on time $T_{ON}$ of the drive control signals $V_{DRIVE1}$, $V_{DRIVE2}$ in response to the load current feedback signal $V_{I-LOAD}$. For example, the control circuit may determine if the magnitude of the load current $I_{LOAD}$ is too high at 1766 (e.g., $I_{LOAD} > I_{TRGT}$). If the magnitude of the load current $I_{LOAD}$ is too high, the control circuit may decrease the on time $T_{ON}$ of the drive control signals $V_{DRIVE1}$, $V_{DRIVE2}$ at 1768. For example, at 1768, the control circuit may decrease the on time $T_{ON}$ by a predetermined amount or by an amount dependent upon the magnitude of the error between the target load current $I_{TRGT}$ and the magnitude of the load current $I_{LOAD}$. After decreasing the on time $T_{ON}$ of the drive control signals $V_{DRIVE1}$, $V_{DRIVE2}$, the control circuit may exit the control loop procedure 1750.

If the control circuit determines that the magnitude of the load current $I_{LOAD}$ is not too high at 1766, then the control circuit may determine whether the magnitude of the load current $I_{LOAD}$ is too low at 1770 (e.g., $I_{LOAD} < I_{TRGT}$). If the control circuit may determines that the magnitude of the load current $I_{LOAD}$ is too low, the control circuit may increase the on time $T_{ON}$ of the drive control signals $V_{DRIVE1}$, $V_{DRIVE2}$ at 1772. For example, at 1772, the control circuit may increase the on time $T_{ON}$ by a predetermined amount or by an amount dependent upon the magnitude of the error between the target load current $I_{TRGT}$ and the magnitude of the load current $I_{LOAD}$. After increasing the on time $T_{ON}$ of the drive control signals $V_{DRIVE1}$, $V_{DRIVE2}$, the control circuit may exit the control loop procedure 1750. If the control circuit determines that the magnitude of the load current $I_{LOAD}$ is not too high at 1766 and is not too low at 1770, the control circuit may exit the control loop procedure 1750.

If the control circuit is operating the forward converter in the inactive state of the burst mode at 1764, the control circuit may exit the control loop procedure 1750 without adjusting the on time $T_{ON}$ of the drive control signals $V_{DRIVE1}$, $V_{DRIVE2}$. Accordingly, the control circuit may freeze the control loop when in the inactive state of the burst mode by not adjusting the on time $T_{ON}$ of the drive control signals $V_{DRIVE1}$, $V_{DRIVE2}$ in response to the average magnitude $I_{AVE}$ of the load current $I_{LOAD}$. If the magnitude of the load current $I_{LOAD}$ is approximately zero amps during the inactive state, the control circuit may maintain the on time $T_{ON}$ of the drive control signals $V_{DRIVE1}$, $V_{DRIVE2}$ (e.g., as stored in the memory 170) to be equal to the last value of the on time from the previous active state.

If the control circuit is operating the forward converter in the active state of the burst mode at 1764, but is not in the regulation time period $T_{REG}$ at 1765, the control circuit may adjust the on time $T_{ON}$ of the drive control signals $V_{DRIVE1}$, $V_{DRIVE2}$ using open loop control at 1774 to ramp up the load current at the beginning of each active state time period $T_{ACTIVE}$ (e.g., during the ramp time period $T_{RAMP}$ as shown in FIG. 14B). The control circuit may also wait for the wait time period $T_{WAIT}$ before once again beginning to adjust the on time $T_{ON}$ of the drive control signals $V_{DRIVE1}$, $V_{DRIVE2}$ in response to the average magnitude $I_{AVE}$ of the load current $I_{LOAD}$ during the next regulation time period $T_{REG}$. Accordingly, the control circuit may maintain the control loop frozen when not in the regulation time period $T_{REG}$ in the active state of the burst mode. The control circuit may control the magnitude of the load current to the minimum rated current $I_{MIN}$ during the next regulation time period $T_{REG}$.

Figure 18:
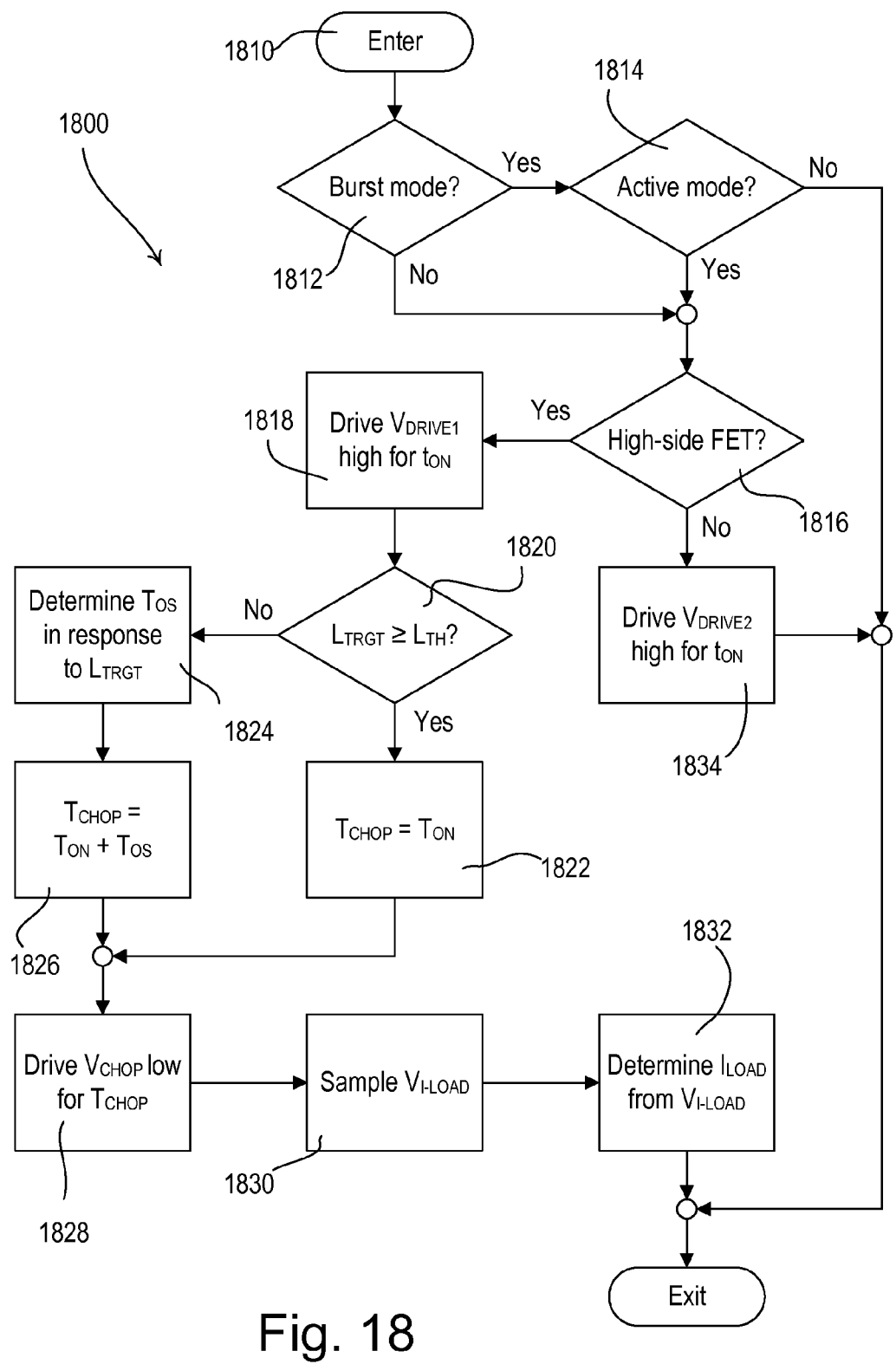

FIG. 18 is a simplified flowchart of an example drive signal procedure 1800, for example, which may be executed periodically. The drive signal procedure 1800 may begin at 1810. The drive signal procedure 1800 may be executed periodically in accordance with the operating period Top of the inverter voltage $V_{INV}$ of the forward converter 240. For example, the control circuit may execute the drive signal procedure 1800 to generate the drive control signals $V_{DRIVE1}$, $V_{DRIVE2}$ using the on time $T_{ON}$ determined during the control loop procedure 1700 of FIG. 17A or the control loop procedure 1750 of FIG. 17B. The control circuit may determine whether it is operating the forward converter in the normal mode at 1812. If not, then the control circuit may determine whether it is operating the forward converter in the active state of the burst mode at 1814. If the control circuit is operating the forward converter in the normal mode or in the active state of the burst mode, the control circuit may determine whether the high-side FET Q210 or the low-side FET Q212 should be controlled at 1816. If the control circuit determines that it should control the high-side FET Q210 at 1816, the control circuit may drive the first drive control signal $V_{DRIVE1}$ high to approximately the supply voltage $V_{CC}$ for the on time $T_{ON}$ at 1818.

The control circuit may determine the magnitude of the load current $I_{LOAD}$ from the load current feedback signal $V_{I\text{-}LOAD}$. The control circuit may determine if the target intensity $L_{TRGT}$ is greater than or equal to the threshold intensity $L_{TH}$ at 1820. If so, the control circuit may set the signal-chopper time $T_{CHOP}$ equal to the on time $T_{ON}$ at 1822. If the control circuit determines that the target intensity $L_{TRGT}$ is less than the threshold intensity $L_{TH}$ at 1820, the control circuit may determine the offset time $T_{OS}$ in response to the target intensity $L_{TRGT}$ at 1824 (e.g., using one or more of the relationships shown in FIGS. 9 and 10). The control signal may set the signal-chopper time $T_{CHOP}$ equal to the sum of the on time $T_{ON}$ and the offset time $T_{OS}$ at 1826.

Next, the control circuit may drive the signal-chopper control signal $V_{CHOP}$ low towards circuit common for the signal-chopper time $T_{CHOP}$ at 1828. The control circuit may sample the averaged load current feedback signal $V_{I\text{-}LOAD}$ at 1830. The control circuit may calculate the magnitude of the load current $I_{LOAD}$ using the sampled value at 1832. For example, the control circuit may calculate the magnitude of the load current $I_{LOAD}$ at 1832 using the following equation:

$$I_{LOAD} = \frac{n_{TURNS} \cdot V_{I\text{-}LOAD} \cdot T_{HC}}{R_{SENSE} \cdot (T_{CHOP} - T_{DELAY})},$$

where $T_{DELAY}$ is the total delay time due to the turn-on time and the turn-off time of the FETs Q210, Q212 (e.g., $T_{DELAY} = T_{TURN\text{-}ON} - T_{TURN\text{-}OFF}$), which may be equal to approximately 200 microseconds. Finally, the control circuit may exit the drive signal procedure 1800 after determining the magnitude of the load current $I_{LOAD}$.

If the control circuit determines that it should control the low-side FET Q212 at 1816, the control circuit may drive the second drive control signal $V_{DRIVE2}$ high to approximately the supply voltage $V_{CC}$ for the on time $T_{ON}$ at 1834. The control circuit may exit the drive signal procedure 1800 without the control circuit driving the signal-chopper control signal $V_{CHOP}$ low or determining the magnitude of the load current $I_{LOAD}$ from the load current feedback signal $V_{I\text{-}LOAD}$. If the control circuit determines that it is operating the forward converter in the burst mode at 1812 and in the inactive state at 1814, the control circuit may exit the drive signal procedure 1800 without generating the drive control signals $V_{DRIVE1}$, $V_{DRIVE2}$.

One or more of the embodiments described herein (e.g., as performed by a load control device) may be used to decrease the intensity of a lighting load and/or increase the intensity of the lighting load. For example, one or more embodiments described herein may be used to adjust the intensity of the lighting load from on to off, off to on, from a higher intensity to a lower intensity, and/or from a lower intensity to a higher intensity. For example, one or more of the embodiments described herein (e.g., as performed by a load control device) may be used to fade the intensity of a light source from on to off (i.e., the low-end intensity $L_{LE}$ may be equal to 0%) and/or to fade the intensity of the light source from off to on.

Although described with reference to an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:
1. A load control device for controlling an amount of power delivered to an electrical load, the load control device comprising:

a load regulation circuit configured to control a magnitude of a load current conducted through the electrical load to control the amount of power delivered to the electrical load; and a control circuit coupled to the load regulation circuit and configured to adjust an average magnitude of the load current, wherein the control circuit is configured to operate in a normal mode to regulate the average magnitude of the load current to a target load current that ranges from a maximum rated current to a minimum rated current, the control circuit further configured to operate in a burst mode to regulate the average magnitude of the load current below the minimum rated current;

wherein, during the burst mode, the control circuit is configured to regulate a peak magnitude of the load current to the minimum rated current during a first time period using a control loop, and to stop regulating the load current during a second time period resulting in the average magnitude of the load current being below the minimum rated current, the control circuit configured to freeze the control loop during the second time period.

2. The load control device of claim 1, wherein the control circuit is configured to control the load regulation circuit in an active state in which the control circuit regulates the peak magnitude of the load current to the minimum rated current during the first time period, the control circuit further configured to control the load regulation circuit in an inactive state in which the control circuit stops regulating the load current during the second time period.

3. The load control device of claim 2, wherein the control circuit is configured to adjust a burst duty cycle defining when the load regulation circuit operates in the active state and the inactive state to adjust the average magnitude of the load current below the minimum rated current when operating in the burst mode.

4. The load control device of claim 3, wherein the control circuit is configured to adjust the average magnitude of the load current to control the amount of power delivered to the electrical load to a target amount of power.

5. The load control device of claim 4, wherein the control circuit is configured to adjust the burst duty cycle in response to the target amount of power when operating in the burst mode.

6. The load control device of claim 5, wherein the control circuit is configured to adjust the burst duty cycle linearly with respect to the target amount of power when operating in the burst mode.

7. The load control device of claim 4, wherein the control circuit is configured to operate in the burst mode when the target amount of power is less than a transition amount of power.

8. The load control device of claim 4, further comprising:
a current sense circuit configured to provide a load current feedback signal that indicates the magnitude of the load current to the control circuit;
wherein the control circuit is configured to regulate the average magnitude of the load current to the target load current in response to the load current feedback signal in the normal mode, the control circuit further configured to regulate the peak magnitude of the load current to the minimum rated current in response to the load current feedback signal in the active state of the burst mode.

9. The load control device of claim 3, wherein, during the burst mode, the control circuit is configured to regulate the average magnitude of the load current by adjusting the burst duty cycle and the target load current.

10. The load control device of claim 9, wherein, during the burst mode, the control circuit is configured to regulate the peak magnitude of the load current to the minimum rated current during the first time period in a first burst mode period and regulate the peak magnitude of the load current to the minimum rated current plus a current offset during the first time period in a second burst mode period.

11. The load control device of claim 10, wherein the current offset ranges from a minimum current offset to a maximum current offset based on the burst duty cycle and a target intensity.

12. The load control device of claim 11, wherein the control circuit is configured to increase the magnitude of the load current from an initial current to the minimum rated current plus the current offset over a ramp time period at a beginning of the first time period.

13. The load control device of claim 1, wherein the load regulation circuit comprises an LED drive circuit for an LED light source.

14. The load control device of claim 13, wherein the LED drive circuit comprises a forward converter.

15. The load control device of claim 1, wherein the control circuit is configured to increase the magnitude of the load current from an initial current to the minimum rated current over a ramp time period at a beginning of the first time period.

16. An LED driver for controlling an intensity of an LED light source, the LED driver comprising:
an LED drive circuit configured to conduct a load current through the LED light source and to control the intensity of the LED light source; and
a control circuit coupled to the LED drive circuit for adjusting an average magnitude of the load current to control the intensity of the LED light source to a target intensity, wherein the control circuit is configured to operate in a normal mode to regulate the average magnitude of the load current to a target load current that ranges from a maximum rated current to a minimum rated current, the control circuit further configured to operate in a burst mode to regulate the average magnitude of the load current below the minimum rated current;
wherein, during the burst mode, the control circuit is configured to control the LED drive circuit in an active state during a first time period in which the control circuit regulates a peak magnitude of the load current to the minimum rated current using a control loop, the control circuit further configured to control the LED drive circuit in an inactive state during a second time period in which the control circuit freezes the control loop to stop regulating the load current, such that the average magnitude of the load current is below the minimum rated current.

17. The LED driver of claim 16, wherein the control circuit is configured to adjust a burst duty cycle defining when the LED drive circuit operates in the active state and the inactive state to adjust the average magnitude of the load current below the minimum rated current when operating in the burst mode.

18. The LED driver of claim 17, wherein the control circuit is configured to adjust the burst duty cycle in response to the target intensity when operating in the burst mode.

19. The LED driver of claim 18, wherein the control circuit is configured to adjust the burst duty cycle linearly with respect to the target intensity when operating in the burst mode.

20. The LED driver of claim 17, further comprising:
a current sense circuit configured to provide a load current feedback signal that indicates a magnitude of the load current to the control circuit;
wherein the control circuit is configured to regulate the average magnitude of the load current to the target load current in response to the load current feedback signal in the normal mode, the control circuit further configured to regulate the peak magnitude of the load current to the minimum rated current in response to the load current feedback signal in the active state of the burst mode.

21. A load control device for controlling an amount of power delivered to an electrical load, the load control device comprising:
a load regulation circuit configured to control a magnitude of a load current conducted through the electrical load to control the amount of power delivered to the electrical load; and
a control circuit coupled to the load regulation circuit and configured to adjust an average magnitude of the load current, wherein the control circuit is configured to operate in a normal mode and a burst mode, wherein the burst mode comprises an active state during a first time period of a burst mode period and an inactive state during a second time period of the burst mode period, and a duration of the active state of the burst mode period is determined based on a burst duty cycle; and
wherein, during the normal mode, the control circuit is configured to regulate the average magnitude of the load current by holding the burst duty cycle constant and adjusting a target load current, and wherein, during the burst mode, the control circuit is configured to regulate the average magnitude of the load current by adjusting the burst duty cycle and the target load current; and
wherein, during the burst mode, the control circuit is configured to adjust the target load current by a current offset that ranges from a minimum current offset to a maximum current offset based on the burst duty cycle and a target amount of power to be delivered to the electrical load.

22. The load control device of claim 21, wherein, during the burst mode, the control circuit is configured to decrease the average magnitude of the load current by decreasing the target load current during consecutive burst mode periods while holding the burst duty cycle constant, and by decreasing the burst duty cycle and increasing the target load current in a succeeding burst mode period.

23. The load control device of claim 21, wherein, during the burst mode, the control circuit is configured to increase the average magnitude of the load current by increasing the target load current during consecutive burst mode periods while holding the burst duty cycle constant, and by increasing the burst duty cycle and decreasing the target load current in a succeeding burst mode period.

24. The load control device of claim 21, wherein, during the burst mode, the control circuit is configured to determine the current offset based on a fractional portion of an ideal burst duty cycle.

25. The load control device of claim 21, wherein, in the normal mode, the control circuit is configured to regulate the average magnitude of the load current to the target load current that ranges from a maximum rated current to a minimum rated current, and wherein, in the burst mode, the control circuit is configured to control the average magnitude of the load current below the minimum rated current.

26. The load control device of claim 21, wherein the normal mode is characterized by the burst duty cycle being equal to approximately 100%.

27. The load control device of claim 21, wherein the control circuit is configured to adjust the burst duty cycle in response to the target amount of power when operating in the burst mode.

28. The load control device of claim 21, wherein the control circuit is configured to adjust the burst duty cycle linearly with respect to the target amount of power when operating in the burst mode.

29. The load control device of claim 21, wherein the control circuit is configured to stop regulating the load current during the second time period.

30. The load control device of claim 21, wherein the load regulation circuit comprises an LED drive circuit for an LED light source.

31. The load control device of claim 21, wherein the control circuit is configured to operate in the burst mode when the target amount of power is less than a transition amount of power.

32. The load control device of claim 21, further comprising:
a current sense circuit configured to provide a load current feedback signal that indicates the magnitude of the load current to the control circuit;
wherein the control circuit is configured to regulate the average magnitude of the load current to the target load current in response to the load current feedback signal in the normal mode.

33. The load control device of claim 21, wherein the control circuit is configured to increase the magnitude of the load current from an initial current to a minimum rated current plus the current offset over a ramp time period at a beginning of the first time period.

34. A load control device for controlling an amount of power delivered to an electrical load, the load control device comprising:
a load regulation circuit configured to control a magnitude of a load current conducted through the electrical load to control the amount of power delivered to the electrical load; and
a control circuit coupled to the load regulation circuit and configured to adjust an average magnitude of the load current, wherein the control circuit is configured to operate in a normal mode to regulate the average magnitude of the load current between a maximum rated current to a minimum rated current, the control circuit further configured to operate in a burst mode to regulate the average magnitude of the load current below the minimum rated current;
wherein, during the burst mode, the control circuit is configured to regulate a peak magnitude of the load current to a target load current during a first time period, and to stop regulating the load current during a second time period resulting in the average magnitude of the load current being below the minimum rated current, the control circuit configured to increase the magnitude of the load current from an initial current to the target load current over a ramp time period at a beginning of the first time period.

35. The load control device of claim 34, wherein the control circuit is configured to regulate the peak magnitude of the load current to the target load current during at least a portion of the first time period using a control loop, wherein the control circuit is configured to freeze the control loop during the second time period.

36. The load control device of claim 35, wherein the control circuit is configured to maintain the control loop frozen while the control circuit is increasing the magnitude of the load current from the initial current to the target load current over the ramp time period.

37. The load control device of claim 36, wherein the control circuit is configured to begin regulating the peak magnitude of the load current to the target load current after the ramp time period during the first time period.

38. The load control device of claim 37, wherein the control circuit is configured to wait for a wait time period after the ramp time period before beginning to regulate the peak magnitude of the load current to the target load current after the ramp time period during the first time period.

39. The load control device of claim 34, wherein the target load current comprises one of the minimum rated current and the minimum rated current plus a current offset.

40. The load control device of claim 39, wherein the current offset ranges from a minimum current offset to a maximum current offset based on a burst duty cycle and a target amount of power to be delivered to the electrical load.

* * * * *